United States Patent
Oesterreicher et al.

(10) Patent No.: US 10,574,715 B2
(45) Date of Patent: Feb. 25, 2020

(54) METHOD AND SYSTEM FOR AGGREGATING CONTENT STREAMS BASED ON SENSOR DATA

(71) Applicant: Shouty, LLC, Johns Creek, GA (US)

(72) Inventors: Richard Oesterreicher, Johns Creek, GA (US); Jonathan Hessing, Johns Creek, GA (US); Zunair Ukani, Johns Creek, GA (US); Austin Schmidt, Johns Creek, GA (US)

(73) Assignee: Streaming Global, Inc., Duluth, GA (US)

( * ) Notice: Subject to any disclaimer, the term of this patent is extended or adjusted under 35 U.S.C. 154(b) by 102 days.

(21) Appl. No.: 15/668,540

(22) Filed: Aug. 3, 2017

(65) Prior Publication Data

US 2019/0044988 A1 Feb. 7, 2019

(51) Int. Cl.
| | |
|---|---|
| *H04L 29/06* | (2006.01) |
| *H04L 12/58* | (2006.01) |
| *H04N 21/235* | (2011.01) |
| *H04N 21/4788* | (2011.01) |
| *H04L 29/08* | (2006.01) |

(52) U.S. Cl.
CPC ............ *H04L 65/602* (2013.01); *H04L 51/32* (2013.01); *H04L 65/1069* (2013.01); *H04L 65/4076* (2013.01); *H04L 67/18* (2013.01); *H04N 21/235* (2013.01); *H04N 21/4788* (2013.01)

(58) Field of Classification Search
CPC ............ H04N 21/816; H04N 21/2343; H04N 21/2581; H04N 21/2407; H04N 21/25891; H04L 65/602; H04L 65/1083

USPC .......................................... 709/203, 217, 231
See application file for complete search history.

(56) References Cited

U.S. PATENT DOCUMENTS

| | | | |
|---|---|---|---|
| 7,675,514 B2 | 3/2010 | Ni et al. | |
| 8,065,628 B2 | 11/2011 | Oshiro et al. | |
| 8,184,169 B2 | 5/2012 | Ortiz | |
| 8,219,930 B2 | 7/2012 | Johns | |
| 8,458,613 B2 | 6/2013 | Oshiro et al. | |

(Continued)

FOREIGN PATENT DOCUMENTS

WO 2015106635 A1 7/2015

OTHER PUBLICATIONS

Xie L, Sundaram H, Campbell M. Event mining in multimedia streams. Proceedings of the IEEE. Mar. 14, 2008;96(4):623-47. (Year: 2008).*

(Continued)

*Primary Examiner* — James N Fiorillo
(74) *Attorney, Agent, or Firm* — Bekiares Eliezer LLP

(57) ABSTRACT

Disclosed is a method of aggregating content streams. The method may include receiving, using a communication unit, a plurality of content streams from a plurality of mobile devices. Further, each of the plurality of mobile devices may include at least one recorder configured to generate a content stream. Furthermore, each of the plurality of content streams may be associated with at least one metadata. Additionally, the method may include analyzing, using a processing unit, the at least one metadata. Further, the method may include aggregating, using the processing unit, the plurality of content streams into an aggregated content stream container based on a result of the analyzing.

16 Claims, 16 Drawing Sheets

(56) References Cited

U.S. PATENT DOCUMENTS

| | | | |
|---|---|---|---|
| 8,554,784 B2* | 10/2013 | Nurminen | G06F 16/78 |
| | | | 707/769 |
| 8,612,517 B1* | 12/2013 | Yadid | H04N 21/25891 |
| | | | 709/201 |
| 8,683,067 B2 | 3/2014 | Herz | |
| 8,874,538 B2 | 10/2014 | Mate et al. | |
| 8,887,088 B2 | 11/2014 | Oshiro et al. | |
| 8,942,536 B2 | 1/2015 | Herz | |
| 8,990,728 B2 | 3/2015 | Oshiro et al. | |
| 9,020,832 B2 | 4/2015 | Fisher et al. | |
| 9,026,596 B2 | 5/2015 | Perez et al. | |
| 9,183,560 B2 | 11/2015 | Abelow | |
| 9,235,765 B2 | 1/2016 | Bentley et al. | |
| 9,509,968 B2 | 11/2016 | Zimmermann et al. | |
| 2002/0047895 A1 | 4/2002 | Bernardo et al. | |
| 2006/0212833 A1 | 9/2006 | Gallagher et al. | |
| 2009/0148124 A1 | 6/2009 | Athsani et al. | |
| 2010/0146055 A1 | 6/2010 | Hannuksela | |
| 2010/0262675 A1* | 10/2010 | Meuninck | H04L 65/1016 |
| | | | 709/219 |
| 2011/0016479 A1* | 1/2011 | Tidwell | G06Q 30/02 |
| | | | 725/9 |
| 2011/0197237 A1* | 8/2011 | Turner | H04N 21/2343 |
| | | | 725/78 |
| 2011/0258049 A1* | 10/2011 | Ramer | G06Q 30/02 |
| | | | 705/14.66 |
| 2012/0200707 A1 | 8/2012 | Stein et al. | |
| 2013/0110631 A1* | 5/2013 | Mitchell | H04W 4/185 |
| | | | 705/14.58 |
| 2014/0195675 A1* | 7/2014 | Silver | H04L 65/1083 |
| | | | 709/224 |
| 2014/0215507 A1* | 7/2014 | Wouhaybi | G06Q 30/02 |
| | | | 725/14 |
| 2014/0281850 A1* | 9/2014 | Prakash | G06F 17/218 |
| | | | 715/202 |
| 2014/0292746 A1 | 10/2014 | Acharya et al. | |
| 2014/0294361 A1 | 10/2014 | Acharya et al. | |
| 2015/0128174 A1 | 5/2015 | Rango et al. | |
| 2015/0220492 A1* | 8/2015 | Simeonov | G06F 16/972 |
| | | | 715/235 |
| 2015/0310043 A1* | 10/2015 | Adelman | G06F 16/21 |
| | | | 705/14.41 |
| 2016/0029088 A1 | 1/2016 | Hutten | |
| 2016/0034712 A1* | 2/2016 | Patton | H04W 4/21 |
| | | | 726/28 |
| 2016/0035224 A1 | 2/2016 | Yang et al. | |
| 2016/0071325 A1 | 3/2016 | Callaghan | |
| 2016/0180883 A1 | 6/2016 | Hamer | |
| 2016/0217325 A1 | 7/2016 | Bose et al. | |
| 2016/0286244 A1 | 9/2016 | Chang et al. | |
| 2017/0111413 A1 | 4/2017 | Nowak | |
| 2017/0249432 A1* | 8/2017 | Grantcharov | H04L 63/0272 |
| 2018/0205963 A1* | 7/2018 | Matei | H04N 19/46 |
| 2018/0288120 A1* | 10/2018 | Dorwin | H04L 47/801 |
| 2019/0014099 A1* | 1/2019 | Vitzthum | H04L 63/08 |
| 2019/0042868 A1 | 2/2019 | Oesterreicher et al. | |

OTHER PUBLICATIONS

International Search Report and Written Opinion dated Oct. 15, 2018 cited in Application No. PCT/US18/45216, 9 pgs.

International Search Report and Written Opinion dated Oct. 16, 2018 cited in Application No. PCT/US18/045226, 9 pgs.

U.S. Non-Final Office Action dated Feb. 26, 2019 cited in U.S. Appl. No. 15/668,510, 7 pgs.

* cited by examiner

CONTENT STREAM 900

CORE DATA:
VIDEO
AUDIO

DYNAMIC SYNCHRONIZED DATA:
SOURCE DEVICE LOCATION
CURRENT TIME
DIRECTION
ANGLE
LIKES
CURRENT VIEWERS
TOTAL VIEWS

STATIC DATA:
SOURCE DEVICE MAKE/MODEL
STREAMER ACCOUNT ID

*FIG. 9*

METHOD AND SYSTEM FOR AGGREGATING CONTENT STREAMS BASED ON SENSOR DATA

RELATED APPLICATION

Related U.S. patent application Ser. No. 15/668,510, filed on even date herewith Aug. 3, 2017 entitled "Methods and Systems for Detecting and Analyzing a Region of Interest from Multiple Points of View," assigned to the assignee of the present application, is hereby incorporated by reference. It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to digital data processing. More specifically, the disclosure relates to a method and system for aggregating content streams based on sensor data.

BACKGROUND

With the increasing use of mobile devices, there is an explosion in the amount of user generated content such as, for example, audio and video recordings. Further, while social media technologies have been developed to enable users to share such user generated content with other users, there exist several limitations.

For instance, a user may be able to readily share a captured content with other users who are connected to the user on a social networking platform. However, other users who may be outside the social network may not be able to consume the captured content, even when the user may have provided public access to the captured content. This is due to the huge amount of online content currently available which makes it a daunting task for users to discover content that may be of interest.

Secondly, user generated content relating to a common topic, event or theme may be captured by several users who may not necessarily be connected to each other on social network platforms. However, a large number of users would prefer to have access to such a collection of user generated content.

Existing technologies allow users to upload user generated content onto a web server which are then categorized using, for example, tags and made available for other users through a search interface. However, searching the huge number of user generated content that may correspond to a common topic or event is a burdensome and time consuming task for users.

An example of user generated content includes live audio and video streams. Further, sharing a live video and/or audio feed from a smart mobile device on a data network such as the Internet, is rapidly gaining popularity. Social networks are promoting this feature to enable users to share their individual live streams with friends and followers. Discovering a single live stream is initiated by a person's live stream showing up in the social network feed of a user that follows them. Therefore, to discover one or more live streams generally requires following a number of individuals or companies on a social network and has nothing to do with the user seeking specific content, relation, or origin location of the live streams.

Accordingly, there is a need for methods and systems for aggregating content, such as for example, user generated content streams and providing it to users in a manner that overcomes one or more of the above mentioned drawbacks.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 9 illustrates a schematic representation of a content stream comprising audio data, video data and metadata such as, but not limited to, location data, time data, orientation data, etc., in accordance with some embodiments.

DETAILED DESCRIPTION

Figure 1A:
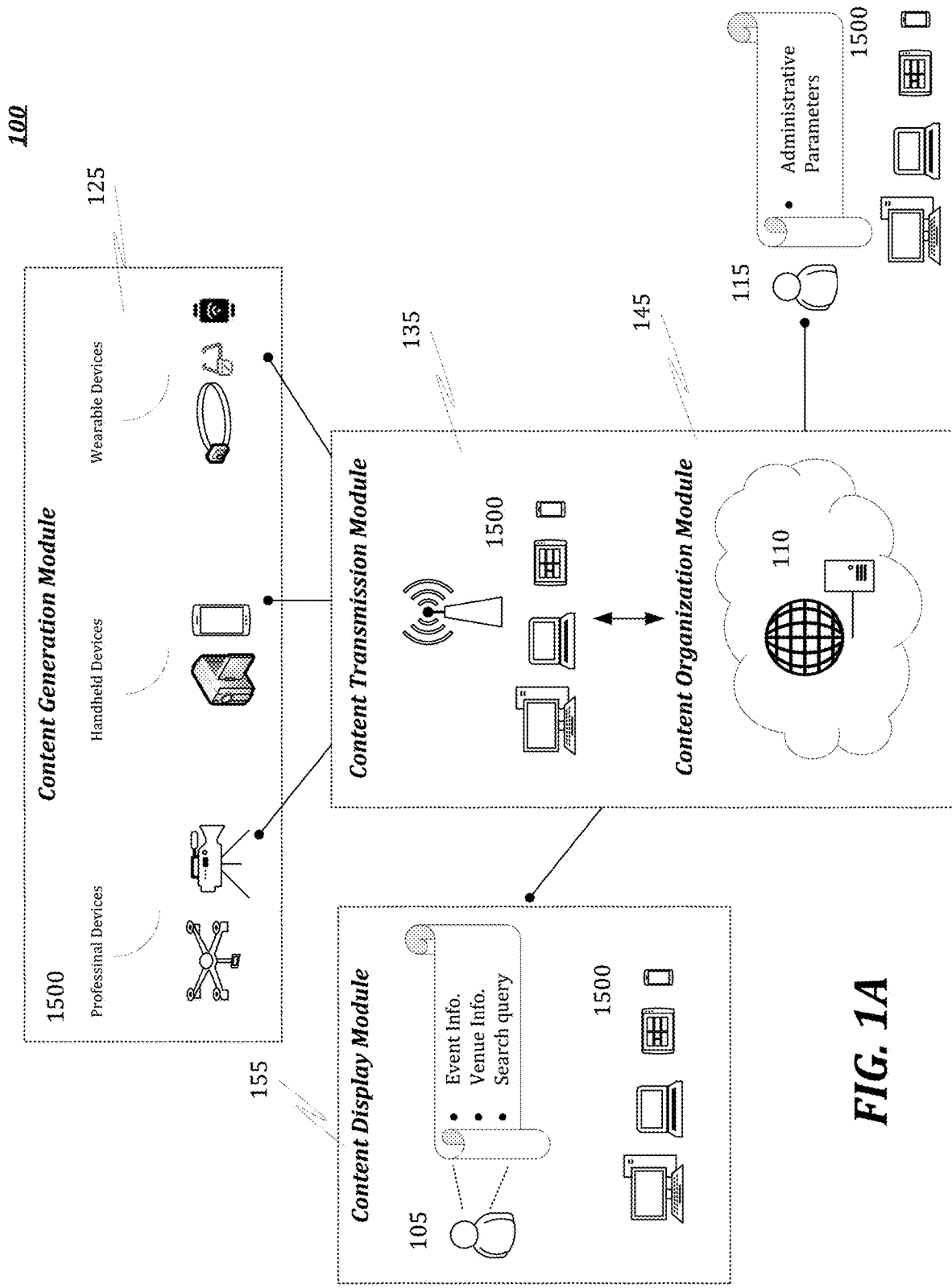
FIGS. 1A and 1B illustrate block diagrams of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed Aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many Aspects and features. Moreover, while many Aspects and features relate to, and are described in, the context of content streams such as live audio/video streams, embodiments of the present disclosure are not limited to use only in this context. For instance, the methods and systems disclosed herein may be used to aggregate any digital content based on corresponding metadata (for example, but not limited to, sensor data) associated with the digital content.

I. Platform Overview

Consistent with embodiments of the present disclosure, content stream aggregation methods, computer-readable media, and systems (also referred to herein as "platform" or aggregation platform) for aggregating content streams based on sensor data may be provided. This overview is provided to introduce a selection of concepts in a simplified form that are further described below. This overview is not intended to identify key features or essential features of the claimed subject matter. Nor is this overview intended to be used to limit the claimed subject matter's scope. The platform may be used by individuals or companies to aggregate content streams.

The present disclosure provides a platform for combining or aggregating multiple streams into events. The streams may be comprised of live content streams or previously recorded content streams. The aggregation of multiple streams may enable context, discoverability, and relationships between multiple otherwise seemingly-random live streams. As will be detailed below, the platform may display the events in a navigable user interface suited for the exploring multiple content streams available from various events.

One of the resulting benefits from the aggregation and navigable user interface presentation of the multiple content streams for each event may include, but not be limited to, searching for and connecting with content of interest, while improving the feeling of presence from multiple points of view. Further, the methods and systems disclosed herein could also be used to provide unique coverage of, for example, a spontaneous news event, or a feeling of presence and connection at a protest, while enabling a stronger unified voice from many participants. It should be understood that the methods and systems may be used to aggregate live streams as well as recorded streams and providing on-demand playback of a previous event. Thus, any reference to a content stream in the present disclosure could be applied to either live streams or recorded streams.

Consistent with embodiments of the present disclosure, multiple streams may correspond to an event. The event may be a collection of data at the same location at the same time. For example, the event may include a football match in a stadium. In another instance, an event may be geographically dispersed yet participated by a number of people at different times. For example, a new year's celebration may occur throughout the world at different relative times in different places.

In accordance to the embodiments disclosed herein, the multiple streams may be captured and uploaded by users, who may be termed as streamers. A streamer may be associated with a computing device configured to provide video and/or audio in the form of a data feed. The computing device may be, for example, but not limited to, a video and/or audio capture device and a communications module to share the captured content over a network. A stream may be the video and/or audio data uploaded onto the network. Further, a collection of streams provided by one or more streamers at the same event, probably from different points of view may constitute a live stream event.

The aggregation of multiple live streams from the same event creates and adds value to the collection of live streams, in the form of context and relation. This context, such as information about the event, the participants, the location, and timing adds data that can be used for indexing, searching, and ultimately discovering relevant live streams, prior to, during, or after the event takes place.

In addition, a viewer of one or more of the content streams may be in control of switching between available synchronized live streams, improving the feeling of presence and connection enabled by experiencing an event from various points of view.

Further, each media stream may contain video and/or audio data. Optionally, each media stream may also contain other forms of dynamic data synchronized to the video and/or audio, such as source device location, current time, direction, angle, individual media stream likes, current views, total views, and static data such as device make/model, and streamer account ID. An exemplary schematic representation of a media stream is shown in FIG. 9.

Figure 10:
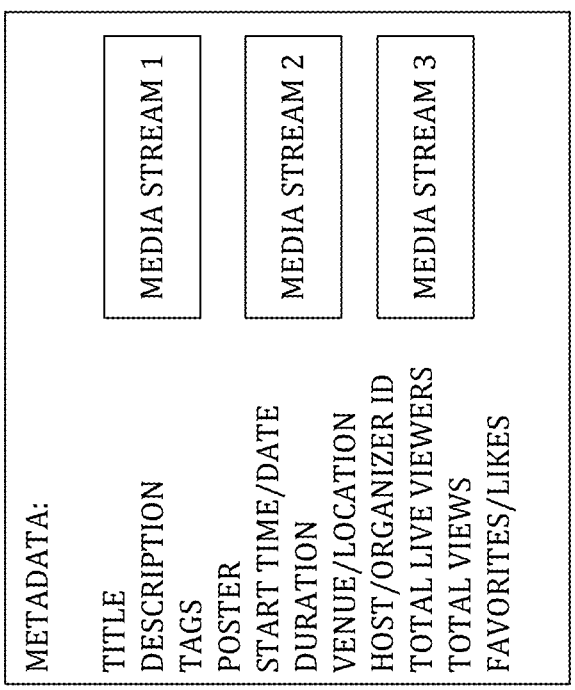
FIG. 10 illustrates a schematic representation of an aggregated content stream comprising a plurality of content streams and metadata, in accordance with some embodiments.

Further, upon aggregating, a multiple stream container may be obtained. An exemplary schematic representation of a multiple stream container is shown in FIG. 10. Each multiple stream container can contain zero or more media streams. Further, the multiple stream container may contain non-stream-specific metadata, such as a title, description, tags, poster artwork, start time/date, duration of overlapping media streams, venue or general location (other than the source device specific location embedded in each media stream), host/organizer account ID, number of current viewers, number of total live viewers, number of total views, number of favorites/likes (with a list of user IDs for each favorite/like), and a collection of contained media streams.

As an example, when an event may be planned, a multiple stream container may be created. The metadata for the event (name, description, venue, etc.) may be entered into the multiple stream container, but there may be zero media streams contained until such time that streamers begin live streaming the event.

Further, once live streams become available from mobile devices of users, the live streams may be aggregated into the multiple stream container. In an instance, aggregation may be performed by combining multiple points of view (POV) visualized relative to each media stream's location. However, aggregation may be not limited to a spatial relationship at a single location. For instance, aggregation could be based on a temporal relationship (same time, different locations), similar interests, or contextual subject matter. An example of a temporal relationship might include viewing streams of new year's celebrations at different places around the globe, in their local time-zones or synchronized together.

In another instance, aggregation may be used for synchronizing multiple versions of the same stream at different encoded bitrates, and seamlessly switching between these streams based on network connectivity condition and/or quality of service. Accordingly, in an embodiment, duplicate streams at differing encoded bitrates may be provided to maintain quality of service, or provide better service in dynamic or unpredictable network connectivity conditions. Further, duplicate streams at different bitrates may not be visualized or selected by the user. They may be selected automatically by the delivery software based on measured network conditions.

Figure 11:
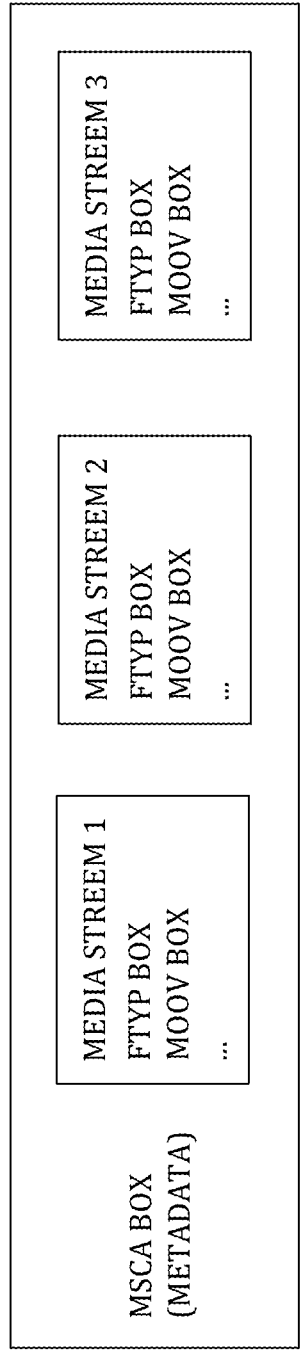
FIG. 11 illustrates a schematic representation of base media file format for encoding an aggregated content stream comprising a plurality of content streams and metadata, in accordance with some embodiments.

Further, in an embodiment, the multiple stream container may be encoded according to a media file format. For example, the ISO/IEC 14496-12 Base Media File Format (BMFF), also referred to as MPEG-4 File Format (MP4) may be extended to incorporate the multiple stream container. A schematic representation of the extended media file format is shown in FIG. 11. The BMFF uses boxes (also known as Atoms) to add structure to the data in the file. These boxes may use a four-character-code (FourCC) name to identify the boxes and their specified content. This enables mapping or parsing an MP4 file without loading unnecessary data.

Further, media stream aggregation could be an extension or superset container for multiple BMFF (MP4) streams. To remain compatible with the ISO BMFF specification the media stream container could create a new box type with the FourCC name of 'msca' for media stream container aggregate. The msca box may be the first box in the stream and may contain the metadata items and a collection of ISO BMFF streams.

Figure 1B:
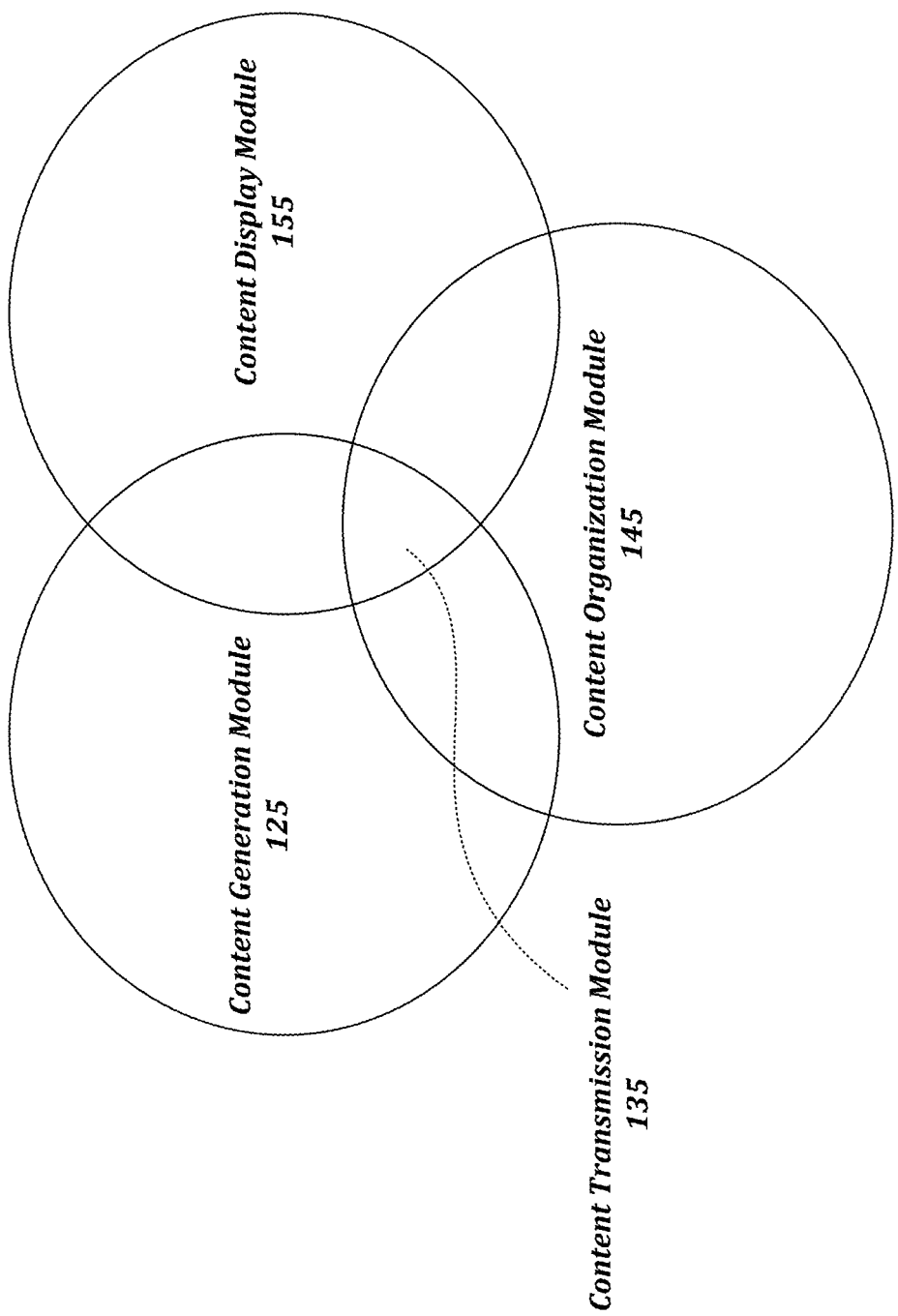

The following is made with reference to FIGS. 1A and 1B.

I. Embodiments of the present disclosure provide a software and hardware platform comprised of a distributed set of modules, including, but not limited to:

A. Content Generation Module 125; and

B. Content Organization Module 145.

In some embodiments, the present disclosure may provide an additional set of modules for further facilitating the software and hardware platform. The additional set of modules may comprise, but not be limited to:

C. Content Display Module 155; and

D. Content Transmission/Streaming Module 135.

FIGS. 1A and 1B illustrate non-limiting examples of operating environments for the aforementioned modules. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

II. Embodiments of the present disclosure provide a software and hardware platform comprised of a distributed set of computing elements, including, but not limited to:

A. A Computing Device

Wherein the platform is operative to control a computing device in furtherance of the operation of the content generation module, The computing device comprising, but not limited to at least one of the following:
 A processing unit,
 A memory storage, Wherein the computing device may be embodied as a mobile computing device,
 wherein the mobile computing device comprises, but is not limited to,
  A tablet,
  A smartphone,
  A drone,
  A wearable camera,
  A handheld camera,
  An installed camera, and
  A remotely operable recording device;

Wherein the computing device may comprise sensing devices,
 wherein the sensing device may comprise, but is not limited to,
  A camera, and
  A microphone; and Wherein the computing device may be in communication with sensing devices, wherein the sensing devices provide telemetry data associated with the computing device;

Wherein the computing device may be embodied as any of the computing elements illustrated in FIG. 1A, including, but not limited to, Content Generation Module 125, Content Organization Module 145, Content Display Module 155; and Content Transmission/Streaming Module 135.

B. Sub-Modules Associated with the Computing Device

Wherein the platform is operative to control at least one of the following sub-modules of a computing device:
 A user interface module,
 A content capturing module,
 A timing module,
 A location module,
 An orientation module, and
 A communications module.

1. The User Interface Module
 a. Enables user-control of the Computing Device
 b. Enables user-control of the Sub-Modules of the Computing Device
  i. The user interface module
  ii. The content capturing module
  iii. The timing module
  iv. The location module
  v. The communications module
 c. Enables user-control of the Platform Modules:
  i. The content generation module
  ii. The content transmission module
  iii. The content organization module
  iv. The content display module 2. The Content Capturing Module
 a. Enables operative control of content recordation hardware
  i. Sensing Device
   1. Optical Sensors
   2. Audio Sensors
   3. Telemetry Sensors
 b. Enables capturing based on data:
  i. Recordation of content received from the communications module
  ii. Recordation of content displayed on the computing device (e.g., screen capture)
 c. Enables Digital Signal Processing on captured content:
  i. Enables Content Stitching based on, but not limited to, spatial parameters and temporal parameters
  ii. Enables image processing techniques such as, but not limited to, image stabilization.

3. The Timing Module
 a. Operative control of a clock associated with the computing device
 b. In operative communication with a central clock
 c. Time stamps content captured by the content capturing module
 d. Used for syncing various content streams 4. The Location Module
 a. Enables the reading and communicating of location data associated with a sensing device;
 b. The location data may be obtained by way of, for example, but not limited to:
  i. GPS/IP Address/Triangulation
  ii. LAN/WAN 5. The Orientation Module
 a. Enables the capture of orientation data from multiple sensing devices associated with the content capture module
 b. See concurrently filed and referenced application "Methods and Systems for Detecting and Analyzing a Region of Interest from Multiple Points of View," U.S. application No. 15/668,510.

6. The Communications Module
 a. Enables the networking of the multiple content capture modules associated with multiple networked devices
 b. In operative communication with other communications modules of computing devices capturing content
 c. Configured to communicate with nearby devices also running on the platform
 d. Configured to join 'groups' of devices capturing content under a similar 'location/theme/etc'
 e. Remote control of the capturing modules
 f. Remote control of the camera
 g. Remote control of the microphone
 h. Via Wireless Media
 i. Via Wired Media Various hardware components may be used at the various stages of operations follow the method and computer-readable medium. For example, although the methods have been described to be performed by a computing device, it should be understood that, in some embodiments, different operations may be performed by different networked elements in operative communication with the computing device. For example, server 110 and/or computing device 1500 may be employed in the performance of some or all of the stages disclosed with regard to the methods below.

III. Embodiments of the present disclosure provide a hardware and software platform operative by a set of methods and computer-readable media comprising instructions configured to operate the aforementioned modules and computing elements in accordance with the methods.

The methods and computer-readable media may comprise a set of instructions which when executed are configured to enable a method for inter-operating at least one of the following modules:
- A. Content Generation Module;
- B. Content Transmission Module;
- C. Content Organization Module; and
- D. Content Display Module The aforementioned modules may be inter-operated to perform a method comprising the following stages:
1. Generating at least one content stream;
2. Capturing data associated with the at least one content stream;
3. Aggregating the data as metadata to the at least one content stream;
4. Transmitting the at least one content stream and the associated metadata;
5. Receiving a plurality of content streams and the associated metadata;
6. Organizing the plurality of content streams,
   a. Wherein organizing the plurality of content streams comprises:
      i. Establishing a multiple stream container for grouping captured content streams of the plurality of content streams based on metadata associated with the captured content streams,
         1. Variation 1:
            Wherein the multiple stream container is established prior to receiving content into the multiple stream container, wherein establishing the multiple stream container comprises:
            a. Receiving a specification of parameters for content streams to be grouped into the multiple stream container,
               i. Wherein the parameters are configured to correspond to data points within the metadata associated with the content streams,
               ii. Wherein receiving the specification of the parameters further comprises receiving descriptive header data associated with the criteria, the descriptive header data being used to display labels associated with the multiple container content stream;
            b. enabling dynamic organization of content streams to be organized into the multiple stream container when the criteria is met,
               i. thereby enabling live content streams received from the at least one computing devices to be more readily organized into the multiple stream container;
         2. Variation 2:
            Wherein the multiple stream container is established subsequent to receiving content for the multiple stream container, wherein establishing the multiple stream container comprises:
            a. Receiving a specification of parameters for content streams to be grouped into the multiple stream container,
               i. Wherein the parameters are configured to correspond to data points within the metadata associated with the content streams,
               ii. Wherein receiving the specification of the parameters further comprises receiving descriptive header data associated with the criteria, the descriptive header data being used to display labels associated with the multiple container content stream;
   b. Wherein organizing the plurality of content streams further comprises:

Embodiment 1: Spatial Proximity i. Analyzing the metadata associated with each of the plurality of content streams for at least one of the following:
   a. geo-location data in order to determine which of the plurality of content streams comprise content captured in spatial proximity;
      i. wherein the geo-location is a definable parameter of the multiple stream container;
      ii. wherein the content streams that comprise content captured in spatial proximity may be determined to comprise content captured at a venue,
         1. wherein the venue is a definable parameter of the multiple stream container,
ii. wherein analyzing the metadata associated with each of the plurality of content streams further comprises:
   a. employing a statistical analysis based on aggregated metadata to determine a frequency of content captured at the geo-location, and
   b. deriving statistical data based on the statistical analysis;

Embodiment 2: Temporal Proximity i. Analyzing the metadata associated with each of the plurality of content streams for at least one of the following:
   a. timing data in order to determine which of the plurality of content streams comprise content captured in temporal proximity;
      i. wherein the timing data is a definable parameter of the multiple stream container;
      ii. wherein the content streams that comprise content captured in temporal proximity may be determined to comprise content captured at a moment of interest,
ii. wherein analyzing the metadata associated with each of the plurality of content streams further comprises:
   a. employing a statistical analysis based on aggregated metadata to determine a frequency of content captured at the timing data, and
   b. deriving statistical data based on the statistical analysis;

Embodiment 3: Event Detection iii. Analyzing the metadata associated with each of the plurality of content streams for at least one of the following:
   a. geo-location data in order to determine which of the plurality of content streams comprise content captured in spatial proximity;
      i. wherein the geo-location is a definable parameter of the multiple stream container;

ii. wherein the content streams that comprise content captured in spatial proximity may be determined to comprise content captured at a venue,
   1. wherein the venue is a definable parameter of the multiple stream container,
b. timing data in order to determine which of the plurality of content streams comprise content captured in temporal proximity;
   i. wherein the timing data is a definable parameter of the multiple stream container;
   ii. wherein the content streams that comprise content captured in temporal proximity may be determined to comprise content captured at a moment of interest,
iv. wherein analyzing the metadata associated with each of the plurality of content streams further comprises:
   a. employing a statistical analysis based on aggregated metadata to determine a frequency of content captured at the geo-location and the timing data, and
   b. deriving statistical data based on the statistical analysis;
v. Determining content streams comprising content captured in spatial proximity and in temporal proximity to comprise content captured at an event in proximal space and time,
   a. Wherein the event is a definable parameter of the multiple stream;
c. Wherein organizing the plurality of content streams further comprises:
Grouping Content Streams into the Container
i. Grouping the content streams into at least one multiple stream container based on, at least in part:
   1. parameters defined for the multiple stream parameter, and
   2. metadata data associated with the content streams
ii. Labeling the content streams within the multiple stream container,
   1. Wherein labeling the content within the multiple stream container comprises, but is not limited to, at least one of the following:
      a. identifiers associated with computing devices used to capture the content,
         i. participant name, account ID, device ID;
      b. a location of capture associated with each content stream,
         i. venue, place, event;
      c. a time of capture associated with each content stream,
         i. date, start-time, end-time, duration;
      d. orientation data associated with each content stream,
      e. statistical data associated with each content stream,
   2. wherein labeling the content streams further comprising labeling the multiple stream container based on parameters and descriptive header associated with the multiple stream container;
   3. wherein labeling the content streams enables indexing, searching, and discovery of the content streams,
7. Providing a plurality of multiple stream containers for presentation and consumption in the user interface module;
   a. Wherein providing the plurality of multiple stream containers for presentation and consumption comprises:
      i. Displaying a visual representation of the content streams associated with the event,
Sub-organization of content streams within the Container
   1. wherein visual representation is organized based on:
      a. Orientation data
      b. Location Data
      c. Various other metadata
   2. wherein grouping the content streams into the at least one multiple stream container further comprises:
      a. Analyzing the metadata associated with each of the grouped content streams for orientation data,
         i. Wherein the orientation data is analyzed to determine a point of view associated with the content,
   3. Determining a point of view associated with the content, and
   4. Arranging the grouped content within the multiple stream container based on the determined point of view,
      a. Wherein arranging the grouped based on the determined point of view comprises, but is not limited to,
         i. Laying out a presentation of each content stream within the container
   5. wherein analyzing the metadata associated with each of the plurality of content streams further comprises:
      a. employing a statistical analysis based on aggregated metadata to determine a frequency of commonly occurring orientation data, and
      b. modifying the visual representation associated with the content streams comprising commonly occurring orientation data based on the frequency.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Embodiments of the present disclosure provide a hardware and software platform operative as a distributed system of modules and computing elements.

A. Content Generation Module

The Content Generation Module may be operative to perform the following stages: Capturing at least one content stream;

Wherein the at least one content stream is captured by at least one computing device as described with reference to, but not limited to, Section (II) above.

Wherein capturing the at least one content stream comprises at least one of the following:
Receiving a command to initiate a capturing of content, and
   initiating the generation of the content stream in response to the initiation command;
Receiving a command to pause the capturing of content,
   Pausing the generation of the content stream in response to the pause command;

Receiving a command to resume the capturing of content,
  Resuming the generation of the content stream in response to the resume command;
    Receiving a command to terminate the capturing of content,
      Terminate the generation of the content stream in response to the termination command;
  wherein the initiation command, the pause command, the resume command, and the termination command may be received via a user interface module of the at least one computing device as described with reference to, but not limited to, Section (II) above; and
  wherein the initiation command, the pause command, the resume command, and the termination command may be received via the communications module of the at least one computing device as described with reference to, but not limited to, Section (II) above.
Capturing telemetry data to be associated with the at least one content stream;
  Wherein the telemetry data comprises data points received from, but not limited to, at least one of the following sub-modules associated with the at least one computing device as described with reference to, but not limited to, Section (II) above:
    The content capturing module,
    The timing module,
    The location module,
    The orientation module, and
    The communications module.
Performing pre-processing based on the received telemetry data,
  Wherein receiving the telemetry data comprises receiving at a sampling frequency associated with the sub-modules,
    Wherein the pre-processing is configured to normalize the telemetry data,
    Wherein the pre-processing is configured to compute an average of the telemetry data, and
Compiling the telemetry data as metadata to be associated with the at least one content stream.
B. Content Transmission/Streaming Module
Transmitting at least one content stream and associated metadata,
  Wherein transmitting the at least one content stream and the associated metadata comprises:
    Transmitting the at least one content stream,
      Wherein the at least one content stream is captured by the computing device, and
    Transmitting the metadata associated with the at least one content stream,
      Wherein the metadata is captured by a device other than the computing device, but is configured to correspond to the at least one content stream,
        Wherein the metadata is transmitted by the other device to the computing device for further transmission;
Receiving the transmission by at least one receiving computing device in operative communication with the transmitting computing device;
  wherein the receiving computing device comprises a centralized server;
Associating the metadata with the at least one content stream,
  Variation 1;
  Wherein associating the metadata with the at least one content stream is performed by the computing device capturing the content stream and the telemetry data,
  Variation 2;
  Wherein associating the metadata with the at least one content stream is performed by a server receiving a transmission from the computing device.
C. Content Organization Module
Organizing the plurality of content streams,
  Wherein organizing the plurality of content streams comprises:
    Establishing a multiple stream container for grouping captured content streams of the plurality of content streams based on metadata associated with the captured content streams,
      Variation 1:
        Wherein the multiple stream container is established prior to receiving content into the multiple stream container, wherein establishing the multiple stream container comprises:
          Receiving a specification of parameters for content streams to be grouped into the multiple stream container,
            Wherein the parameters are configured to correspond to data points within the metadata associated with the content streams,
            Wherein receiving the specification of the parameters further comprises receiving descriptive header data associated with the criteria, the descriptive header data being used to display labels associated with the multiple container content stream;
          enabling dynamic organization of content streams to be organized into the multiple stream container when the criteria is met,
          thereby enabling live content streams received from the at least one computing devices to be more readily organized into the multiple stream container;
      Variation 2:
      Wherein the multiple stream container is established subsequent to receiving content into the multiple stream container, wherein establishing the multiple stream container comprises:
        Receiving a specification of parameters for content streams to be grouped into the multiple stream container,
          Wherein the parameters are configured to correspond to data points within the metadata associated with the content streams,
          Wherein receiving the specification of the parameters further comprises receiving descriptive header data associated with the criteria, the descriptive header data being used to display labels associated with the multiple container content stream;
  Wherein organizing the plurality of content streams further comprises:

Embodiment 1: Spatial Proximity

Analyzing the metadata associated with each of the plurality of content streams for at least one of the following:

geo-location data in order to determine which of the plurality of content streams comprise content captured in spatial proximity;
  wherein the geo-location is a definable parameter of the multiple stream container;
  wherein the content streams that comprise content captured in spatial proximity may be determined to comprise content captured at a venue,
    wherein the venue is a definable parameter of the multiple stream container,
wherein analyzing the metadata associated with each of the plurality of content streams further comprises:
  employing a statistical analysis based on aggregated metadata to determine a frequency of content captured at the geo-location, and
  deriving statistical data based on the statistical analysis;

Embodiment 2: Temporal Proximity

Analyzing the metadata associated with each of the plurality of content streams for at least one of the following:
  timing data in order to determine which of the plurality of content streams comprise content captured in temporal proximity;
    wherein the timing data is a definable parameter of the multiple stream container;
    wherein the content streams that comprise content captured in temporal proximity may be determined to comprise content captured at a moment of interest,
wherein analyzing the metadata associated with each of the plurality of content streams further comprises:
  employing a statistical analysis based on aggregated metadata to determine a frequency of content captured at the timing data, and
  deriving statistical data based on the statistical analysis;

Embodiment 3: Event Detection

Analyzing the metadata associated with each of the plurality of content streams for at least one of the following:
  geo-location data in order to determine which of the plurality of content streams comprise content captured in spatial proximity;
    wherein the geo-location is a definable parameter of the multiple stream container;
    wherein the content streams that comprise content captured in spatial proximity may be determined to comprise content captured at a venue,
      wherein the venue is a definable parameter of the multiple stream container,
  timing data in order to determine which of the plurality of content streams comprise content captured in temporal proximity;
    wherein the timing data is a definable parameter of the multiple stream container;
    wherein the content streams that comprise content captured in temporal proximity may be determined to comprise content captured at a moment of interest,
wherein analyzing the metadata associated with each of the plurality of content streams further comprises:
  employing a statistical analysis based on aggregated metadata to determine a frequency of content captured at the geo-location and the timing data, and
  deriving statistical data based on the statistical analysis;
Determining content streams comprising content captured in spatial proximity and in temporal proximity to comprise content captured at an event in proximal space and time,
  Wherein the event is a definable parameter of the multiple stream;
Wherein organizing the plurality of content streams further comprises:
  Grouping Content Streams into the Container
  Grouping the content streams into at least one multiple stream container based on, at least in part:
    parameters defined for the multiple stream parameter, and metadata data associated with the content streams
  Labeling the content streams within the multiple stream container,
    Wherein labeling the content within the multiple stream container comprises, but is not limited to, at least one of the following:
      identifiers associated with computing devices used to capture the content,
        participant name, account ID, device ID;
      a location of capture associated with each content stream,
        venue, place, event;
      a time of capture associated with each content stream, date, start-time, end-time, duration;
      orientation data associated with each content stream,
        statistical data associated with each content stream,
    wherein labeling the content streams further comprising labeling the multiple stream container based on parameters and descriptive header associated with the multiple stream container;
    wherein labeling the content streams enables indexing, searching, and discovery of the content streams,
  Stitching captured content streams;
    Wherein generating the at least one content stream further comprises at least one of the following:
      Receiving a command to stitch the captured content stream with another captured content stream;
        wherein the stitching command comprises stitching parameters,
          wherein the stitching parameters define a type of content stitching:
            the stitching type comprising at least one of the following:
              a spatial stitching of content,
              a temporal stitching of content,
              a contextual-based stitching of content, and
              an interested-based stitching of content;
      Stitching, in response to receiving the stitching command, the generated content stream with the other captured content stream to form a single content stream,
        wherein stitching to form the single content stream comprises, but is not limited to, at least one of the following:
          Stitching based on the parameters of the stitching command,
            Wherein the temporal stitching of content is based on, at least in part, metadata associated with each stitched content stream, such that the content is stitched in series,
              Wherein temporal stitching employs at least the following:

the metadata obtained from the content capture module, and
the metadata obtained from the location detection module,
Wherein the spatial stitching of content is based on, at least in part, metadata associated with each stitched content stream, such that, for example, a frame from each content stream is stitched to form a larger frame;
the metadata obtained from the content capture module,
the metadata obtained from the location detection module, and
the metadata obtained from the orientation module;

D. Content Display Module

Providing a plurality of multiple stream containers for presentation and consumption in the user interface module;
Wherein providing the plurality of multiple stream containers for presentation and consumption comprises:
Displaying a visual representation of the content streams associated with the event,
Sub-organization of content streams within the Container
wherein visual representation is organized based on:
Orientation data
Location Data
Various other metadata
wherein grouping the content streams into the at least one multiple stream container further comprises:
Analyzing the metadata associated with each of the grouped content streams for orientation data,
Wherein the orientation data is analyzed to determine a point of view associated with the content,
Determining a point of view associated with the content, and
Arranging the grouped content within the multiple stream container based on the determined point of view,
Wherein arranging the grouped based on the determined point of view comprises, but is not limited to,
Laying out a presentation of each content stream within the container
wherein analyzing the metadata associated with each of the plurality of content streams further comprises:
employing a statistical analysis based on aggregated metadata to determine a frequency of commonly occurring orientation data, and
modifying the visual representation associated with the content streams comprising commonly occurring orientation data based on the frequency.

Both the foregoing overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and subcombinations described in the detailed description.

II. Platform Configuration

FIGS. 1A and 1B is an illustration of a platform consistent with various embodiments of the present disclosure. By way of non-limiting example, the online platform 100 for aggregating multiple content streams based on sensor data may be hosted on a centralized server 110, such as, for example, a cloud computing service. The centralized server may communicate with other network entities, such as, for example, a plurality of mobile devices, wearable devices (such as watches or smart glasses), encoding devices, electronic devices (such as desktop computers, laptop computers etc.) and one or more recording devices (e.g., camera drones, handheld camera, or installed cameras) over a communication network, such as, but not limited to, the Internet. Further, users of the platform may include, but are not limited to, content creators (e.g. live streamers), content consumers (e.g. viewers/listeners of live streams) and platform managers (e.g. administrator or moderator). Accordingly, electronic devices operated by the content creators and content consumers may be in communication with the platform.

A user 105, such as a content creator, a content consumer or a moderator, may access platform 100 through a software application. The software application may be embodied as, for example, but not be limited to, a website, a web application, a desktop application, and a mobile application compatible with a computing device 1500. One possible embodiment of the software application may be provided by Shouty-Live™ products and services.

Accordingly, in an instance, the user 115 may be a moderator who creates a multiple stream container by specifying for example, event information, venue information and stream quality criteria (minimum spatial or temporal resolution, minimum recording length, etc.) and so on. In another instance, the user 115 may be a content creator. Accordingly, the user 115 may provide event information and/or venue information in addition to capturing content (audio and/or video).

In yet another instance, the user 105 may be a content consumer. Accordingly, the user 105 may provide a selection input based on which one or more of content streams from an aggregated content stream may be selected and presented to the user 105. Additionally, the user 105 may provide a search query using metadata such as location data, orientation data, etc. and retrieve content streams corresponding to the specified metadata.

In an instance, the platform 100 may receive a plurality of content streams from a plurality of mobile devices, such as smartphones, tablet computers, drone cameras, wearable devices, handheld cameras, etc. In addition, in some embodiments, the platform 100 may also receive one or more content streams from stationary electronic devices such as tripod mounted cameras, fixed sound recording devices, surveillance cameras and so on. In addition, the platform 100 may receive one or more sensor data streams from one or more sensors. In an instance, the one or more sensors may be external to the plurality of mobile devices and the stationary electronic devices.

In another instance, the one or more sensors may be comprised in the plurality of mobile devices and/or the stationary electronic devices. For example, the plurality of mobile devices may include one or more of a location sensor for sensing geolocation, an orientation sensor for sensing orientation of a mobile device along one or more axis, a ranging sensor for sensing distance of an object from the mobile device, a sound sensor for sensing sound, a light sensor for sensing light intensity, a motion sensor for sensing movement of the mobile device, an accelerometer and one or more environmental sensors for sensing environmental variables (e.g. temperature, humidity, etc.).

Figure 2:
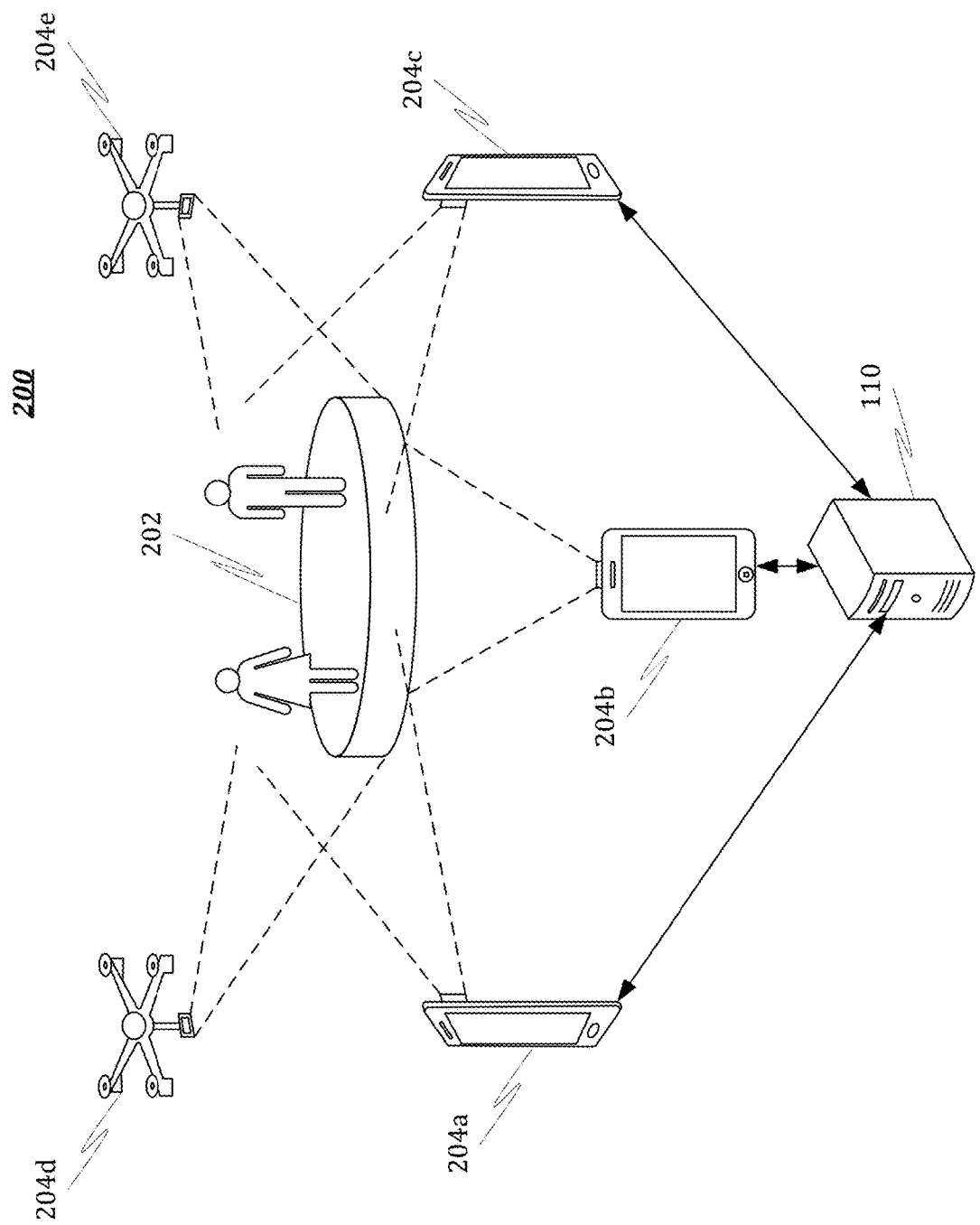
FIG. 2 illustrates operation of a system for aggregating content streams based on sensor data, in accordance with some embodiments.

Further, in an instance, the plurality of content streams may include metadata comprising time data and sensor data. Furthermore, the sensor data may include location data and orientation data. For example, with reference to FIG. 2, the location data and the orientation data may correspond to capturing of content (e.g. audio and/or video of an event) by a mobile device (e.g., devices 204a-204c or professional devices 204d and 204e). Accordingly, in an instance, the mobile device may be executing an app configured to capture the location data and the orientation data while the mobile device is capturing content. Further, the app may be configured to embed the location data and the orientation data within the captured content in digital form. For example, the data may be combined with an associated content stream as metadata. In some embodiments, a region of interest 202 may be detected as referred to in concurrently filed and referenced application "Methods and Systems for Detecting and Analyzing a Region of Interest from Multiple Points of View," U.S. application No. 15/668,510. In an instance, the app may be provided by the platform 100. As a result, a content stream provided by the mobile device may include indication of one or more locations at which the mobile device was present while capturing the content stream. Similarly, the content stream may also include indication of one or more orientations of the mobile device during capturing of the content stream.

Figure 3:
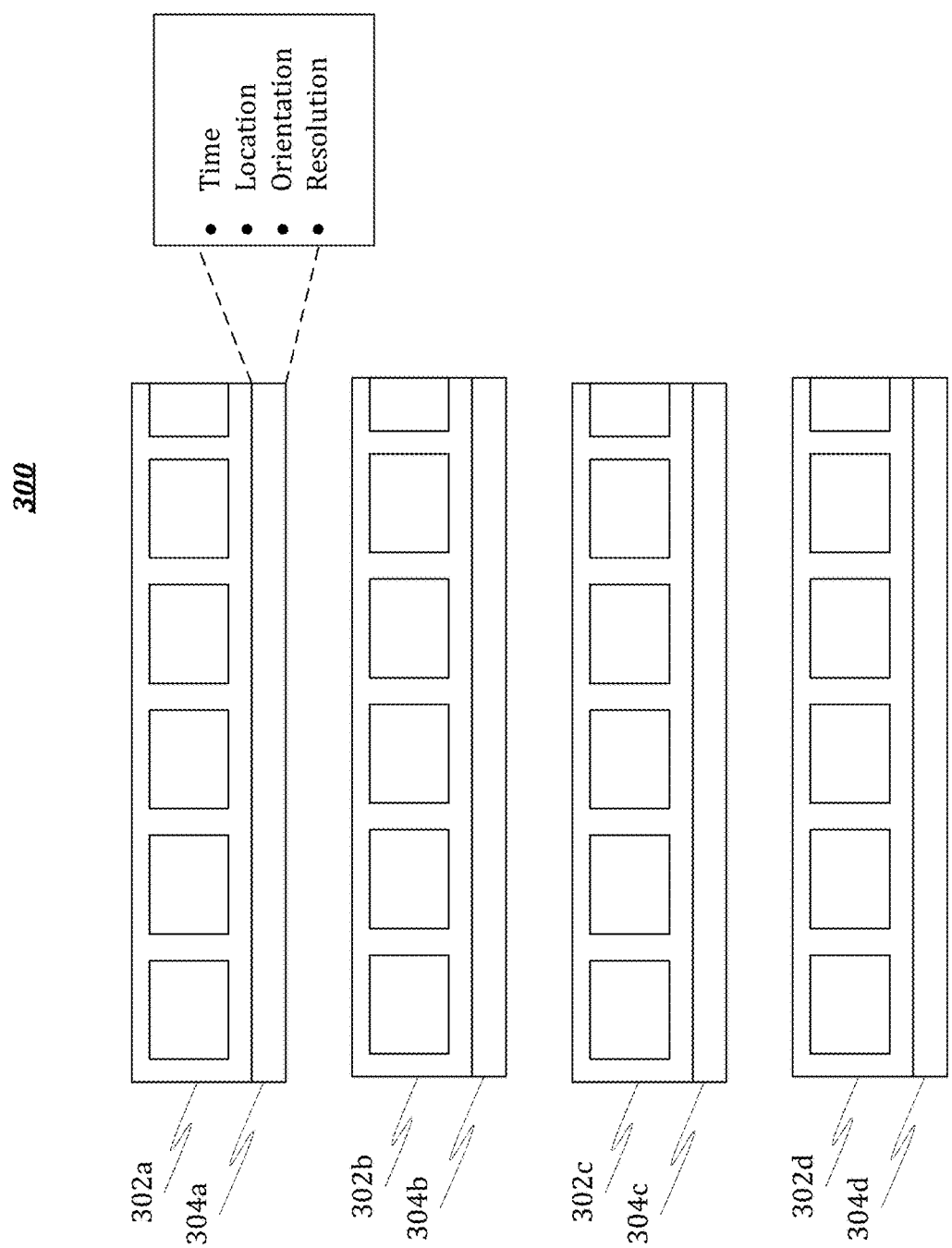
FIG. 3 illustrates a schematic representation of a plurality of content streams comprising metadata such as, but not limited to, location data, time data, orientation data, etc., in accordance with some embodiments.

For example, a user seated in a front row of a concert hall may be recording a concert at the concert hall with a mobile device. Accordingly, the metadata may include the geographical location of the concert hall and orientation/tilt of the mobile device. Further, in some embodiments, a more accurate location of the mobile device may be determined and included as location data. Accordingly, one or more high accuracy location detection techniques, such as for example, triangulation, may be employed. FIG. 3 illustrates a plurality of generated content streams 302a-302d with corresponding metadata streams 304a-304d.

Further, in some embodiments, the app may be configured to transmit a short range beacon signal with a predetermined code and at a predetermined intensity. Accordingly, one or more other mobile devices which may also include an instance of the app may be able to receive the beacon signal and estimate relative distances and/or relative locations. Further, the app may be configured to include such relative distances and/or relative locations in the metadata of a corresponding content stream. As a result, the platform 100 may obtain relative locations of mobile devices with a greater degree of accuracy.

Accordingly, the platform 100 may receive the plurality of content streams including sensor data (e.g. location data and orientation data). Subsequently, in some instances, the platform 100 may be configured to perform a pre-processing of the metadata retrieved from the plurality of content streams. The pre-processing may include, for example, filtering of the sensor data. For example, one or more of the location data and the orientation may include fluctuations due to natural hand movements of users while capturing audio and/or video. Accordingly, the pre-processing may include a low pass filtering to eliminate such fluctuations. Additionally, in some embodiments, the pre-processing may include normalization of one or more of the location data, the orientation data and/or time data. For instance, the location data and/or the orientation data may be encoded in different measurement system across the plurality of mobile devices. Accordingly, the platform 100 may perform a normalization to obtain location data and/or orientation data in a common measurement system.

Additionally, in cases where the mobile devices execute motion during capturing of content, the location data and orientation data may vary. Accordingly, the plurality of mobile devices may be configured to regularly sample the location data and the orientation data. As a result, each content stream may include a stream of location data and/or orientation data. Further, due to variability across the plurality of mobile devices, the sampling frequency and/or resolution of location data and/or orientation data may be different. Accordingly, in an instance, the pre-processing may include normalizing the location data and/or the orientation data with regard to sampling frequency and/or resolution. In yet another instance, the pre-processing may include computing averages (e.g. centroid) corresponding to a plurality of location data and/or a plurality of orientation data received from a mobile device.

Subsequently, the platform 100 may be configured to analyze the metadata across the plurality of content streams in order to determine correlations. Accordingly, in an instance, since analysis of metadata is relatively less compute-intensive compared to analysis of audio and/or video content, correlation among the plurality of content streams (e.g. relating to the same event) may be determined more quickly and inexpensively. Further, based on the correlations determined, the platform 100 may aggregate the plurality of content streams into an aggregated content stream.

Figure 4:
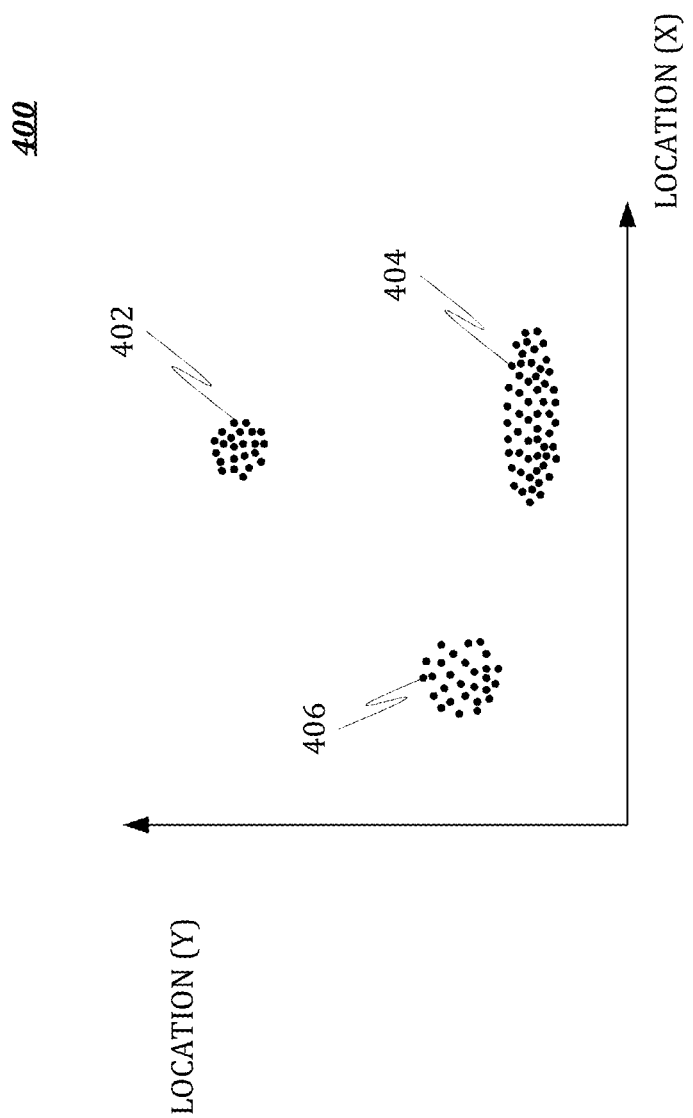
FIG. 4 illustrates a graph obtained by plotting X coordinate versus Y coordinate of location data corresponding to a plurality of content streams, in accordance with some embodiments.

For example, an analysis of the location data across the plurality of content streams may indicate that location data corresponding to each of the mobile devices falls within a bounded spatial region, which is representative of a singular location, such as, for example, a stadium, a concert hall, an open ground etc. For instance, as illustrated in FIG. 4, analysis of location data, such as latitude (X) and longitude (Y) may indicate formation of clusters of mobile devices such as cluster 402, cluster 404 and cluster 406. Accordingly, the platform 100 may determine one or more events or venues corresponding to detection of one or more such spatial clusters.

Figure 5:
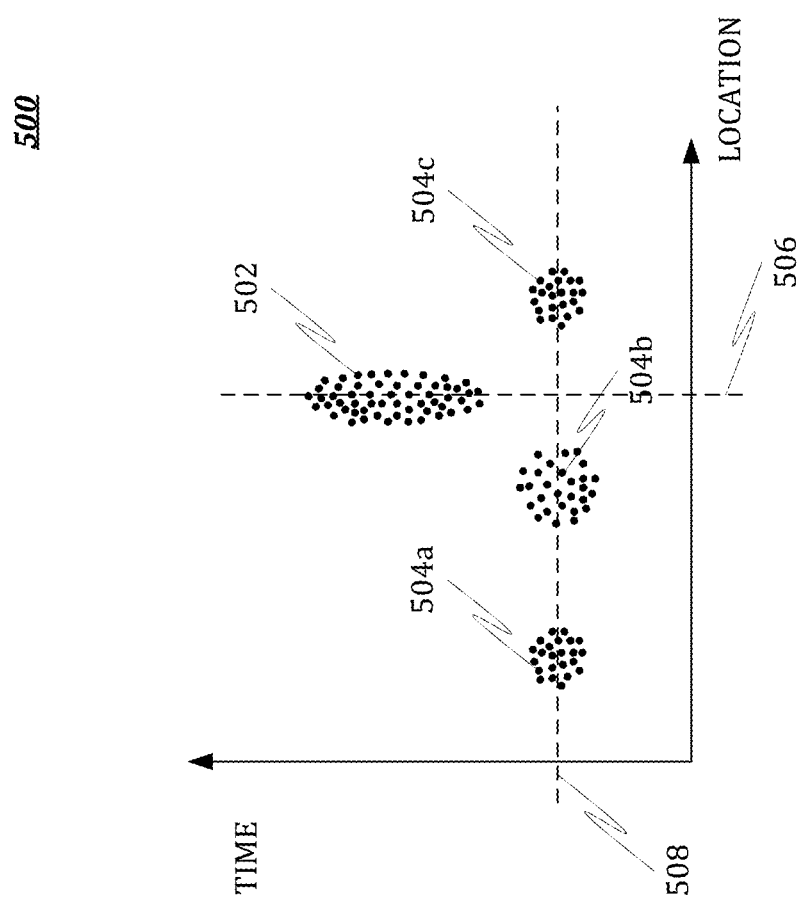
FIG. 5 illustrates a graph obtained by plotting location data against time data corresponding to a plurality of content streams, in accordance with some embodiments.

As another example, as illustrated in FIG. 5, the platform 100 may analyze location data against time data included in the metadata of the plurality of content streams. Accordingly, the analysis may indicate spatial clusters with a temporal pattern. For instance, cluster 502 may be identified as a group of mobile devices at a location 506 streaming content for a substantially long amount of time. Accordingly, cluster 502 may correspond to an event such as, for example, a concert occurring at the location 506 for a relative long duration of time. In contrast, clusters 504a-c may be identified as groups of mobile devices situated at different locations but streaming content at the same time 508 for a short time duration. Accordingly, clusters 504a, 504b and 504c may correspond to a geographically dispersed event, for example, new year celebrations occurring at different locations at the same time 508.

Figure 6:
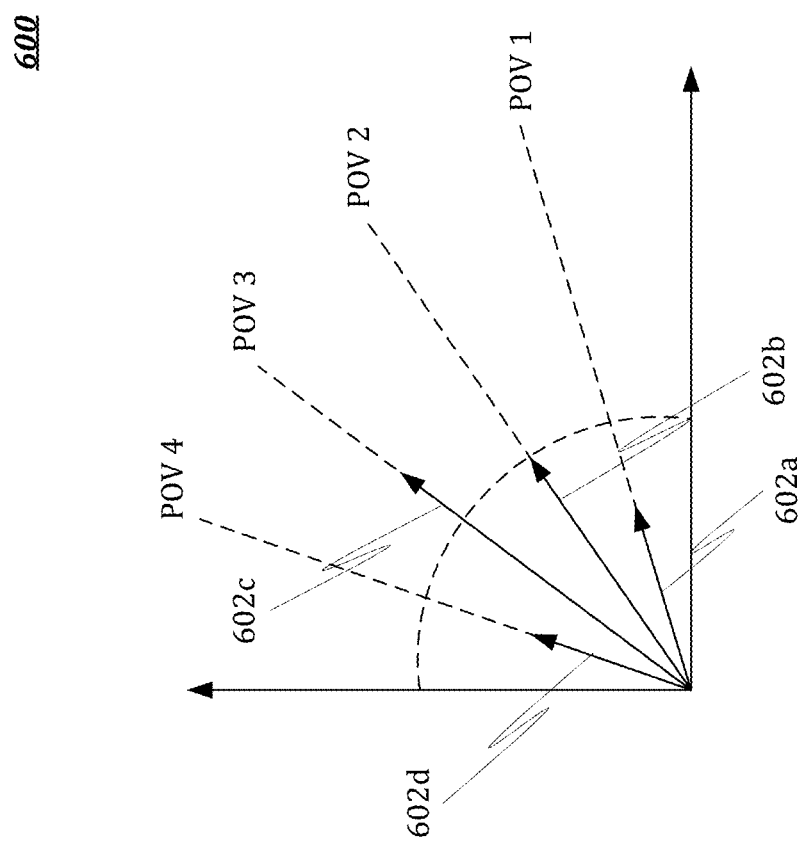
FIG. 6 illustrates a graph obtained by plotting orientation data against frequency of occurrence of orientation data corresponding to a plurality of content streams, in accordance with some embodiments.

As another example, as illustrated in FIG. 6, the platform 100 may analyze orientation data across the plurality of content streams. b. See Methods and Systems for Detecting and Analyzing a Region of Interest from Multiple Points of View," U.S. application No. 15/668,510. Accordingly, the platform 100 may determine a plurality of point of views (POVs) of the mobile devices capturing content corresponding to an event. For example, an analysis of the orientation data may indicate that mobile devices forming cluster 402 correspond to one of several POVs, such as, for example, POV1, POV2, POV3 and POV4. Further, a statistical analysis of the orientation data may be performed by the platform 100 in order to determine a frequency of occurrence of each POV in the cluster 402. Accordingly, a frequency 602a corresponding to the number of mobile devices oriented along POV1 may be determined. This is visually represented as length of arrow along the direction POV1. Similarly, frequency 602b, 602c and 602d corresponding to POV2, POV3, and POV4 respectively may be determined by the platform 100.

Figure 7:
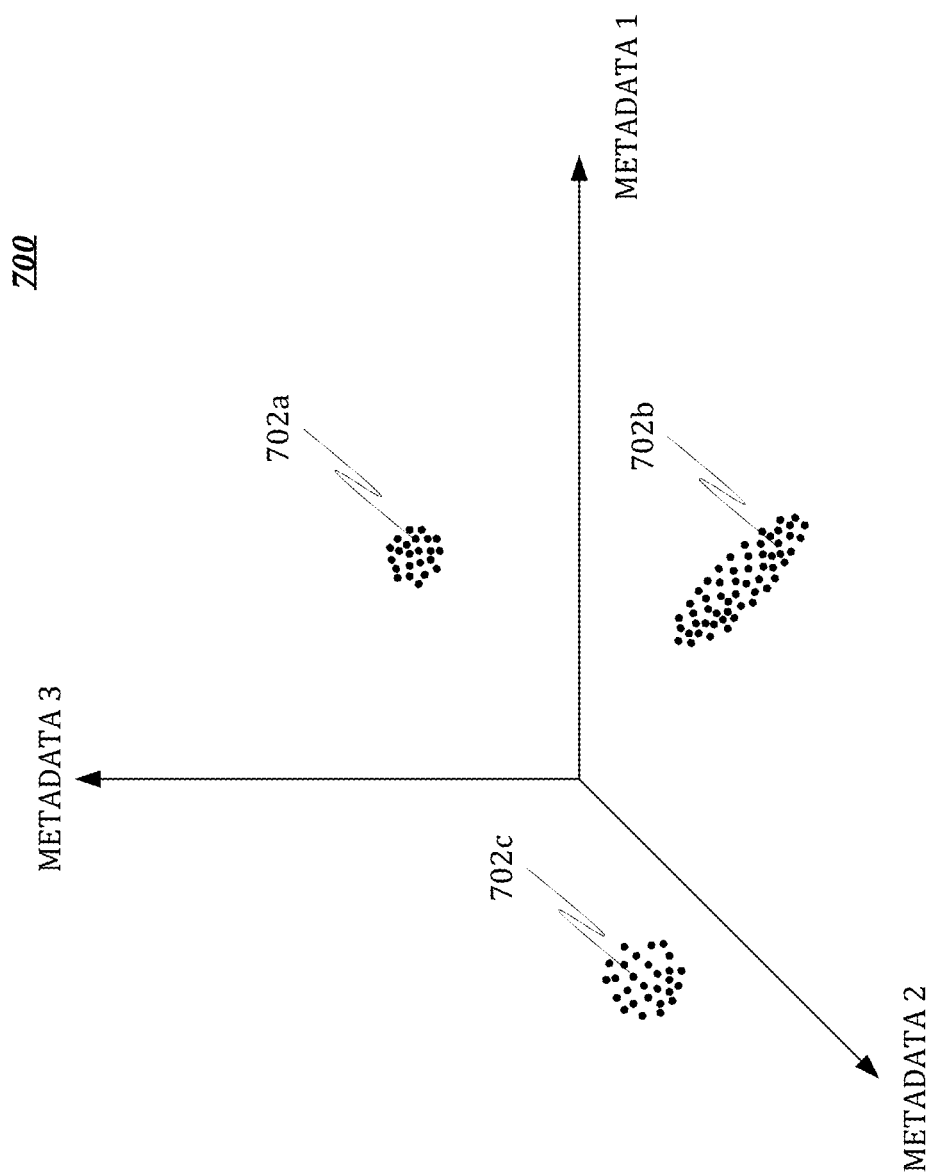
FIG. 7 illustrates a graph obtained by plotting three or more metadata corresponding to a plurality of content streams, in accordance with some embodiments.

Further, in yet another example, as illustrated in FIG. 7, the platform 100 may analyze three or more metadata across the plurality of content streams in order to discover correlations. As an example, analysis of location data, orientation data and time data may indicate formation of clusters 702a, 702b and 702c as shown. Consequently, characteristics of a cluster (e.g. position along a dimension, size, shape etc. and variation thereof) may provide useful insights regarding the corresponding mobile devices generating the corresponding content streams.

Figure 8:
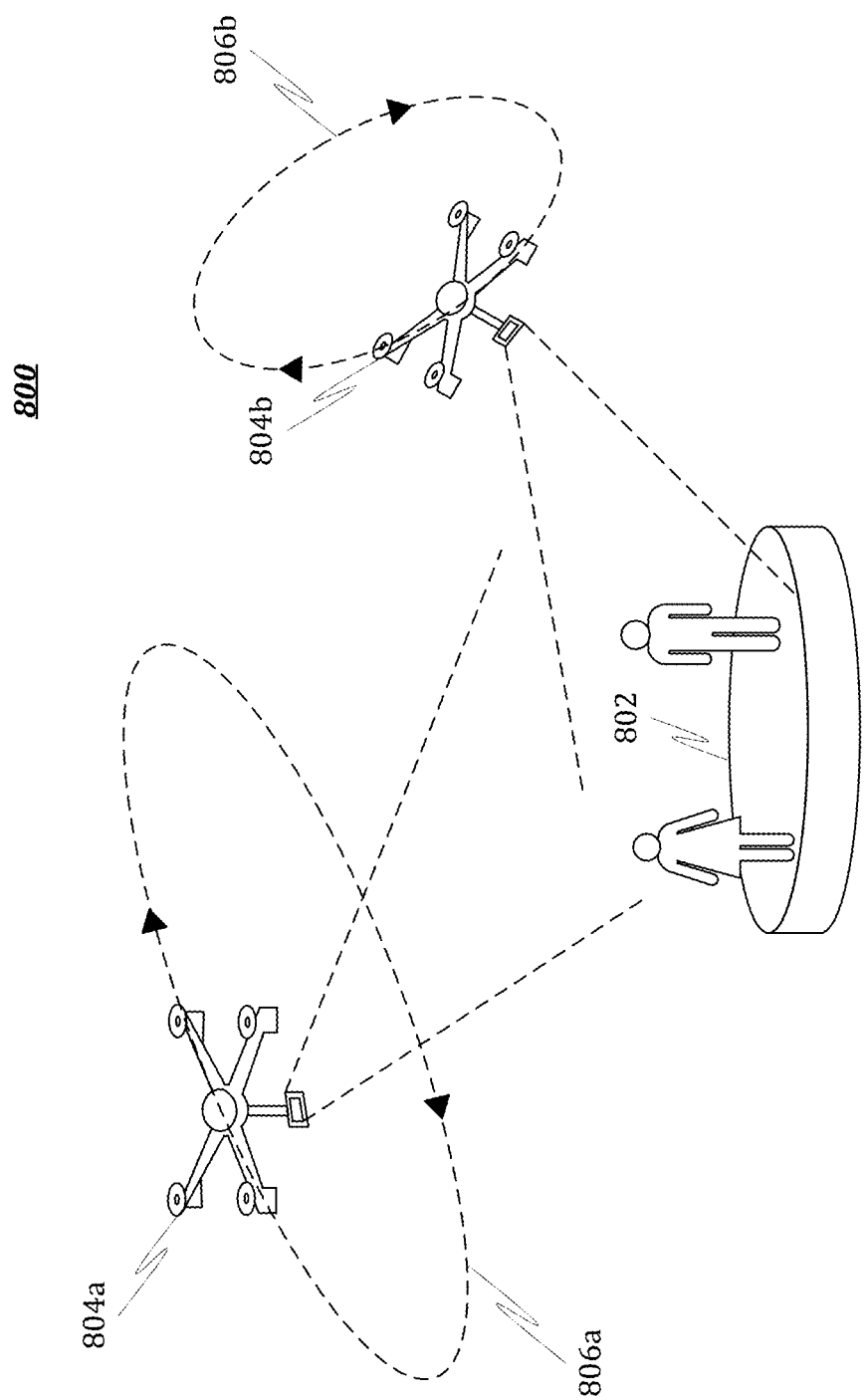
FIG. 8 illustrates operation of a system for aggregating content streams captured by drone cameras based on sensor data, in accordance with some embodiments.

As another example, as illustrated in FIG. 8, the platform 100 may analyze metadata comprising sensor data to determine that the plurality of mobile devices is in motion during capturing of the plurality of content streams. For example, a stage 802 may be filmed by a plurality of camera drones 804a and 804b executing trajectories 806a and 806b respectively. Further, each of camera drones 804a and 804b may include motion sensors configured to capture motion data representative of trajectories 806a and 806b respectively. Further, the motion data may include speed data and direction data. Accordingly, in an instance, the platform 100 may be configured to determine a plurality of mobile devices moving at substantially similar speeds and/or in substantially similar directions.

Accordingly, based on the analysis of the metadata, the platform 100 may discover a contextual relationship between the plurality of content streams. For example, based on an analysis of location data, the platform 100 may discover the plurality of content streams as relating to an event occurring at a specific location. Accordingly, the platform 100 may aggregate the plurality of content streams into the aggregated content stream. In some embodiments, the platform 100 may be configured to aggregate the plurality of content streams in order to provide multiple streams that are substantially similar with regard to a first metadata (e.g. location), while being diverse with regard to another metadata (e.g. orientation). Accordingly, users may be provided with contextually related streams which enhance user experience.

Further, the aggregated content stream may be annotated with an aggregated metadata specifying for example, event information, venue information, location data, time data, number of mobile devices, orientation data, number of current viewers etc. Accordingly, users who may be interested in consuming audio and/or video represented in the aggregated content stream may search and discover the aggregated content stream based on metadata such as event information, venue information, location data etc. Alternatively, the aggregated content stream may be provided to users based on a topic based subscription. For examples, users who may have expressed interest in sporting events may be presented with an indication of the aggregated content stream. Accordingly, the users may select and consume the aggregated content stream.

As will be detailed with reference to FIG. 15 below, the computing device through which the aggregation platform may be accessed may comprise, but not be limited to, for example, a desktop computer, laptop, a tablet, or mobile telecommunications device. As will be detailed with reference to FIG. 15 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

III. Platform Operation

Although methods 1200, 1300 and 1400 have been described to be performed by platform 100, it should be understood that computing device 1500 may be used to perform the various stages of methods 1200, 1300 and 1400. Furthermore, in some embodiments, different operations may be performed by different networked elements in operative communication with computing device 1500. For example, server 110 may be employed in the performance of some or all of the stages in methods 1200, 1300 and 1400. Moreover, server 110 may be configured much like computing device 1500.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 1200, 1300 and 1400 will be described in greater detail below.

Figure 12:
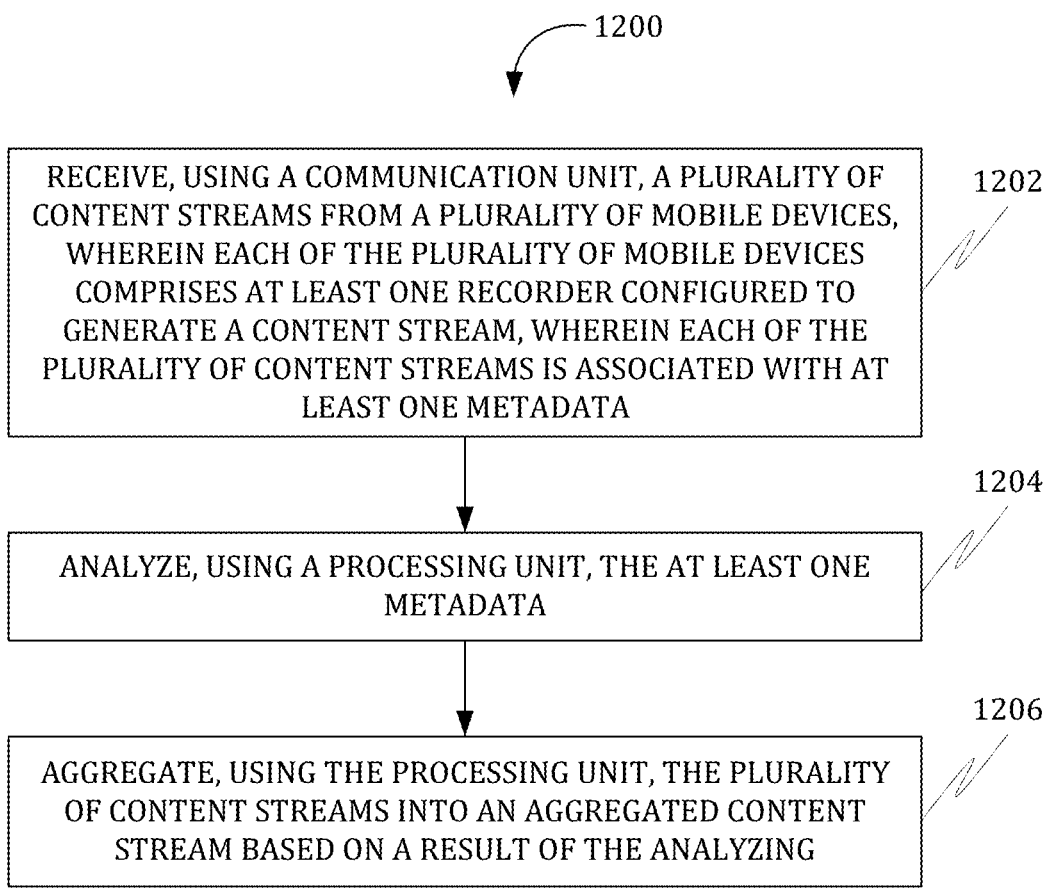
FIG. 12 illustrates a flowchart of a method of aggregating content streams based on sensor data, in accordance with some embodiments.

FIG. 12 illustrates a flowchart of a method 1200 of aggregating content streams based on sensor data, in accordance with some embodiments. In some embodiments, the content stream may include one or more of an audio stream and a video stream. In some embodiments, the plurality of mobile devices may include at least one drone configured for flight.

The method 1200 may include a stage 1202 of receiving, using a communication unit, a plurality of content streams from a plurality of mobile devices. Further, each of the plurality of mobile devices may include at least one recorder configured to generate a content stream. Furthermore, each of the plurality of content streams may be associated with at least one metadata.

In some embodiments, the at least one metadata may include one or more of a time data, a location data, a context data, a device indicator and a device state indicator. In some embodiments, the device indicator may be associated with at least one characteristic of the at least one recorder. In some embodiments, the at least one characteristic may include a spatial resolution, a temporal resolution, white balance, gain, shutter speed, aperture size, a focal length and an encoding scheme. In some embodiments, the device state indicator associated with a content stream indicates at least one state of a mobile device generating the content stream. In some embodiments, the at least one state corresponds to at least one sensor comprised in the mobile device. In some embodiments, the at least one sensor may include one or more of a location sensor, an orientation sensor, an accelerometer, an altitude sensor and a speed sensor.

In some embodiments, the at least one metadata may include a time data. Further, each of the plurality of mobile devices may include a timer configured to generate the time data. Further, each timer may be synchronized to a common time base.

Additionally, the method 1200 may include a stage 1202 of analyzing, using a processing unit, the at least one metadata. In some embodiments, the analyzing may include comparing a first metadata associated with a first content stream with a second metadata associated with a second content stream. Further, the aggregating may include determining each of the first content stream and the second content stream as being associated with an event based on a result of the comparing.

In some embodiments, the result of the comparing may include a difference between the first metadata and the second metadata. Further, the determining may be based on the difference being less than a predetermined threshold.

In some embodiments, the result of the comparing may include a difference between the first metadata and the second metadata. Further, the determining may be based on the difference being greater than a predetermined threshold.

In some embodiments, the result of the comparing may include a difference between the first metadata and the second metadata. Further, the determining may be based on the difference being within a predetermined range.

Further, the method 1200 may include a stage 1202 of aggregating, using the processing unit, the plurality of content streams into an aggregated content stream based on a result of the analyzing. In some embodiments, the method 1200 may further include transmitting the aggregated content stream to at least one mobile device of the plurality of mobile devices.

In some embodiments, the first content stream may be associated with a first location and the second content stream may be associated with a second location. Further, the first metadata indicates the first location. Further, the second metadata indicates the second location. Further, the aggregated content stream may include the plurality of content streams corresponding to a plurality of locations. Further, the plurality of content streams corresponds to an event.

In some embodiments, the first content stream may be associated with a first Point Of View (POV) and the second content stream may be associated with a second POV. Further, the first metadata indicates the first POV. Further, the second metadata indicates the second POV. Further, the aggregated content stream may include the plurality of content streams corresponding to a plurality of POVs. Further, the plurality of content streams may correspond to an event.

In some embodiments, the method 1200 may further include transmitting a plurality of indicators corresponding to the plurality of content streams in the aggregated content stream to at least one mobile device. Further, the method 1200 may include receiving a selection of at least one indicator of the plurality of indicators from the at least one mobile device. Additionally, the method 1200 may include transmitting at least one content stream corresponding to the at least one indicator to the at least one mobile device.

In some embodiments, the method 1200 may further include encoding the aggregated content stream based on a media file format. In some embodiments, the media file format may include ISO/IEC 14496-12 Base Media File Format (BMFF).

Figure 13:
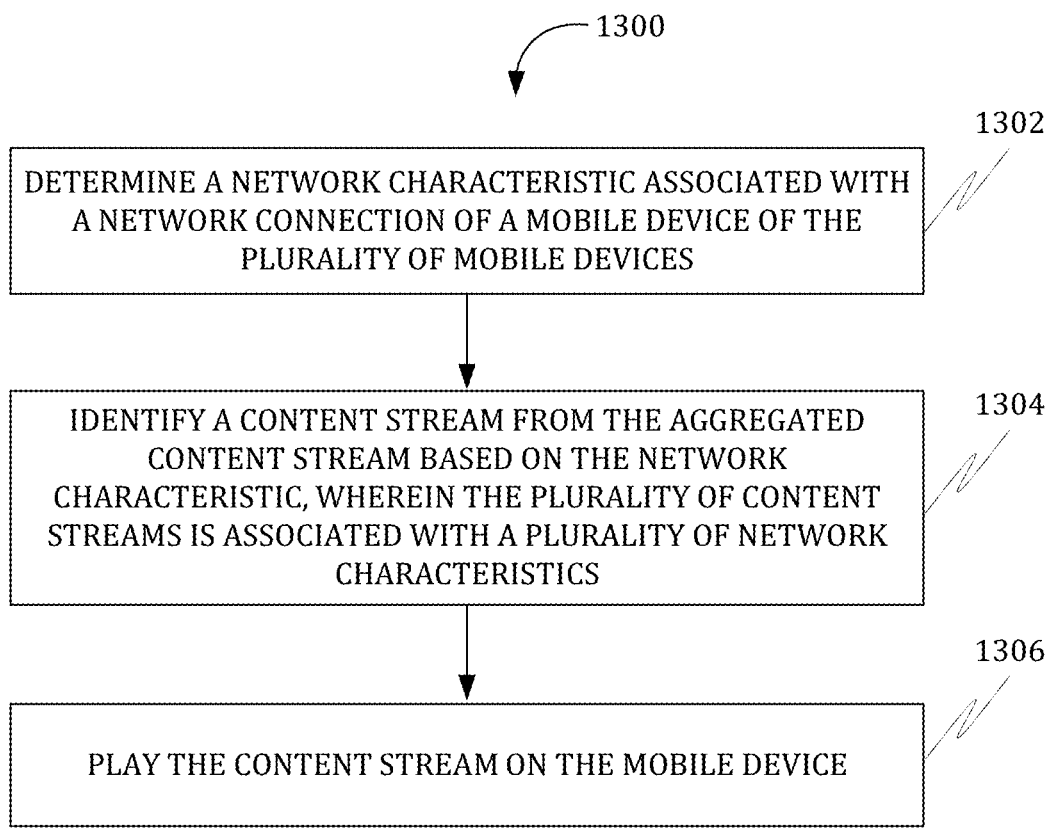
FIG. 13 illustrates a flowchart of a method of selecting a suitable content stream from an aggregated content stream based on a network characteristic, in accordance with some embodiments.

FIG. 13 illustrates a flowchart of a method 1300 of selecting a suitable content stream from an aggregated content stream based on a network characteristic, in accordance with some embodiments. In some embodiments, the network characteristic may include one or more of network bandwidth, error rate, signal distortion, type of communication channel and network communication standard.

The method may include a stage 1302 of determining a network characteristic associated with a network connection of a mobile device of the plurality of mobile devices. Further, the method 1300 may include a stage 1304 of identifying a content stream from the aggregated content stream based on the network characteristic. Further, the plurality of content streams may be associated with a plurality of network characteristics. Additionally, the method 1300 may include a stage 1306 of playing the content stream on the mobile device.

In an embodiment, the network characteristic may be detected by the mobile device and subsequently, the network characteristic may be transmitted to the platform. In response, the platform may identify the content stream based on the network characteristic. Accordingly, the playing may include transmitting the content stream to the mobile device.

In some embodiments, the method 1300 may further include determining a device characteristic of a mobile device of the plurality of mobile devices. In some embodiments, the device characteristic may include one or more of screen resolution, refresh rate, decoding capability, processor speed and memory capacity. Additionally, the method 1300 may include identifying a content stream from the aggregated content stream based on the device characteristic. Further, the plurality of content streams may be associated with a plurality of device characteristics. Additionally, the method 1300 may include transmitting the content stream to the mobile device.

Figure 14:
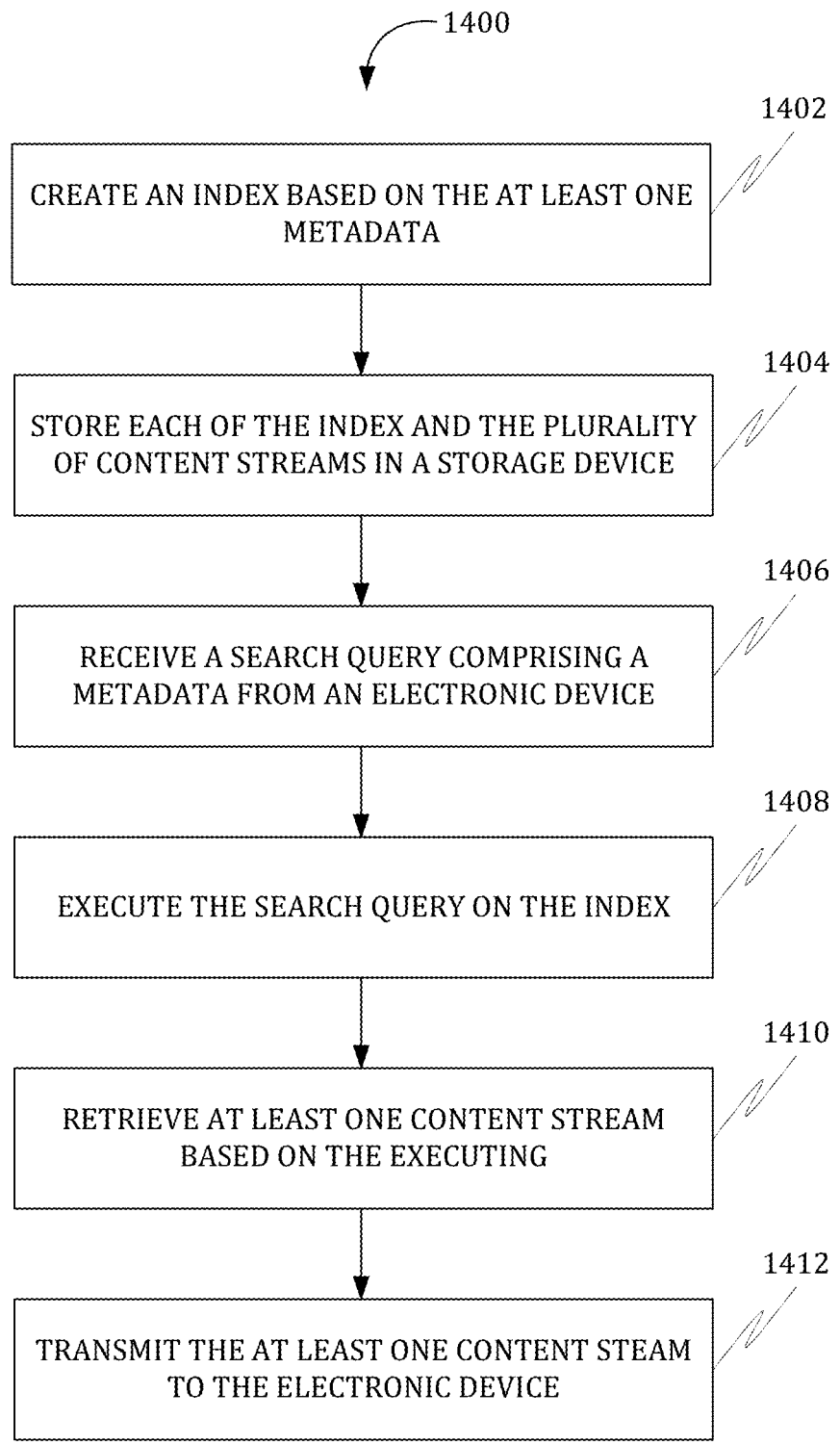
FIG. 14 illustrates a flowchart of a method of searching a plurality of content streams based on sensor data such as, but not limited to, location data, orientation data etc., in accordance with some embodiments.

FIG. 14 illustrates a flowchart of a method 1400 of searching a plurality of content streams based on sensor data such as, but not limited to, location data, orientation data etc., in accordance with some embodiments. The method may include a stage 1402 of creating an index based on the at least one metadata. Further, the method 1400 may include a stage 1404 of storing each of the index and the plurality of content streams in a storage device. Additionally, the method 1400 may include a stage 1406 of receiving a search query including a metadata from an electronic device. Furthermore, the method 1400 may include a stage 1408 of executing the search query on the index. Further, the method 1400 may include a stage 1410 of retrieving at least one content stream based on the executing. Additionally, the method 1400 may include a stage 1412 of transmitting the at least one content steam to the electronic device.

IV. Platform Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 1200, 1300 and 1400 have been described to be performed by a computing device 1500, it should be understood that, in some embodiments, different operations may be performed by different networked elements in operative communication with computing device 1500.

Embodiments of the present disclosure may comprise a system having a memory storage and a processing unit. The processing unit coupled to the memory storage, wherein the processing unit is configured to perform the stages of methods 1200, 1300 and 1400.

Figure 15:
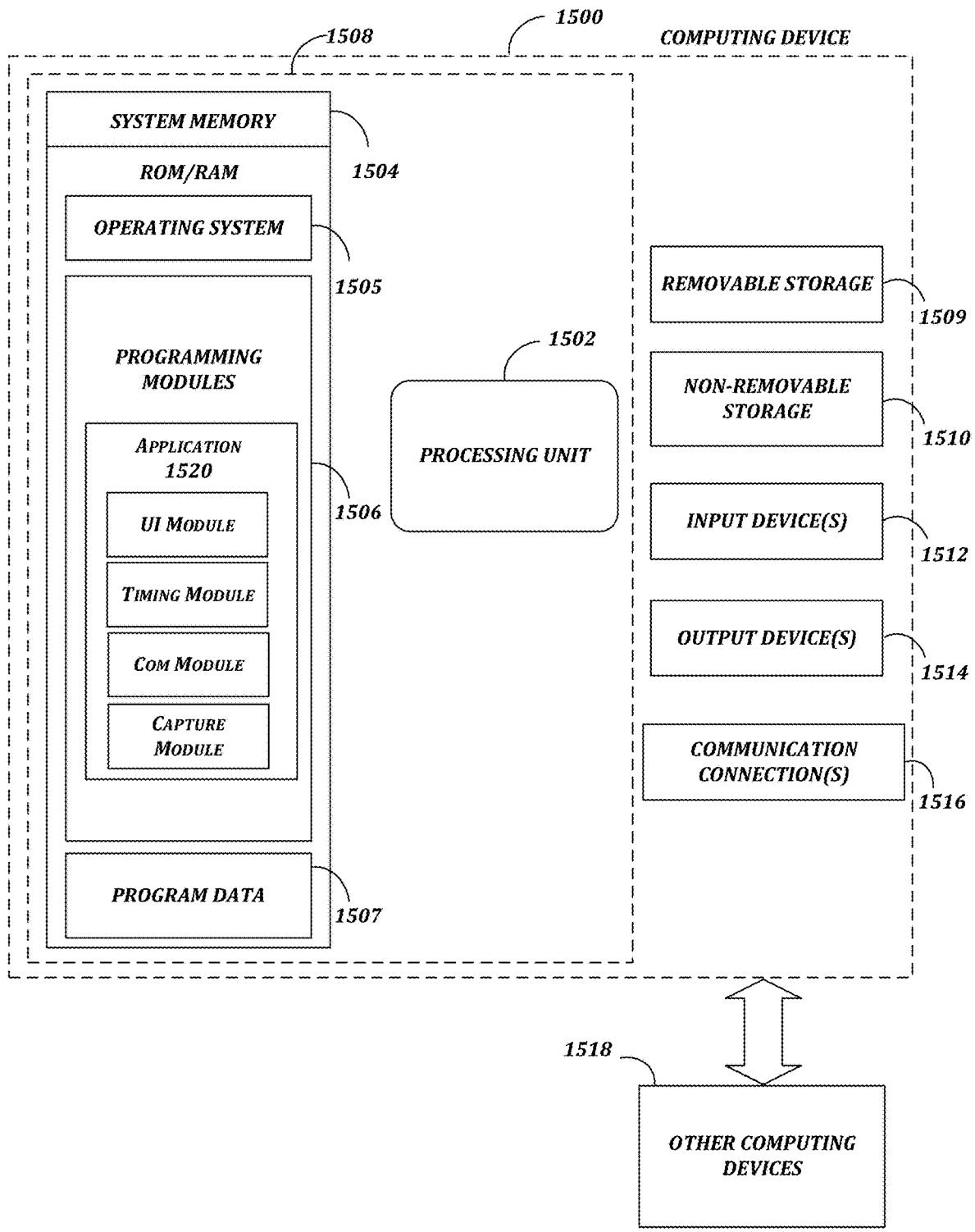
FIG. 15 illustrates a block diagram of a system for aggregating content streams based on sensor data, in accordance with some embodiment.

FIG. 15 is a block diagram of a system including computing device 1500. Consistent with an embodiment of the disclosure, the aforementioned memory storage and processing unit may be implemented in a computing device, such as computing device 1500 of FIG. 15. Any suitable combination of hardware, software, or firmware may be used to implement the memory storage and processing unit. For example, the memory storage and processing unit may be implemented with computing device 1500 or any of other computing devices 1518, in combination with computing device 1500. The aforementioned system, device, and processors are examples and other systems, devices, and processors may comprise the aforementioned memory storage and processing unit, consistent with embodiments of the disclosure.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g. random access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image encoding module, machine learning module and image classifying module. Furthermore, programming modules 1506 may comprise a user interface module, a content capturing module, a timing module, a location module, an orientation module, and a communications module, a content generation module, a content transmission module, a content organization module, and a content display module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and nonvolatile, removable and non-removable media implemented in any method or technology for storage of information, such as computer readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520) may perform processes including, for example, stages of one or more of methods 1200, 1300 and 1400 as described above. The aforementioned process is an example, and processing unit 1502 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. A method of aggregating content streams, the method comprising: receiving, using a communication unit, a plurality of content streams from a plurality of mobile devices, wherein each of the plurality of mobile devices comprises at least one recorder configured to generate a content stream, wherein each of the plurality of content streams is associated with at least one metadata;
analyzing, using a processing unit, the at least one metadata; and aggregating, using the processing unit, the plurality of content streams into an aggregated content stream container based on a result of the analyzing.

Aspect 2. The method of Aspect 1, wherein the content stream comprises at least one of an audio stream and a video stream.

Aspect 3. The method of Aspect 1, wherein the at least one metadata comprises at least one of a time data, a location data, a context data, a device indicator and a device state indicator.

Aspect 4. The method of Aspect 3, wherein the device indicator is associated with at least one characteristic of the at least one recorder.

Aspect 5. The method of Aspect 4, wherein the at least one characteristic comprises a spatial resolution, a temporal resolution, white balance, gain, shutter speed, aperture size, a focal length and an encoding scheme.

Aspect 6. The method of Aspect 3, wherein the device state indicator associated with a content stream indicates at least one state of a mobile device generating the content stream.

Aspect 7. The method of Aspect 6, wherein the at least one state corresponds to at least one sensor comprised in the mobile device.

Aspect 8. The method of Aspect 7, wherein the at least one sensor comprises at least one of a location sensor, an orientation sensor, an accelerometer, an altitude sensor and a speed sensor.

Aspect 9. The method of Aspect 8, wherein the plurality of mobile devices comprises at least one drone configured for flight.

Aspect 10. The method of Aspect 1, wherein the at least one metadata comprises a time data, wherein each of the plurality of mobile devices comprise a timer configured to generate the time data, wherein each timer is synchronized to a common time base.

Aspect 11. The method of Aspect 1, wherein the analyzing comprises comparing a first metadata associated with a first content stream with a second metadata associated with a second content stream, wherein the aggregating comprises determining each of the first content stream and the second content stream as being associated with an event based on a result of the comparing.

Aspect 12. The method of Aspect 11, wherein the result of the comparing comprises a difference between the first metadata and the second metadata, wherein the determining is based on the difference being less than a predetermined threshold.

Aspect 13. The method of Aspect 11, wherein the result of the comparing comprises a difference between the first metadata and the second metadata, wherein the determining is based on the difference being greater than a predetermined threshold.

Aspect 14. The method of Aspect 13, wherein the first content stream is associated with a first Point Of View (POV) and the second content stream is associated with a second POV, wherein the first metadata indicates the first POV, wherein the second metadata indicates the second POV, wherein the aggregated content stream comprises the plurality of content streams corresponding to a plurality of POVs, wherein the plurality of content streams correspond to an event.

Aspect 15. The method of Aspect 13, wherein the first content stream is associated with a first location and the second content stream is associated with a second location, wherein the first metadata indicates the first location, wherein the second metadata indicates the second location, wherein the aggregated content stream comprises the plurality of content streams corresponding to a plurality of locations, wherein the plurality of content streams corresponds to an event.

Aspect 16. The method of Aspect 11, wherein the result of the comparing comprises a difference between the first metadata and the second metadata, wherein the determining is based on the difference being within a predetermined range.

Aspect 17. The method of Aspect 1 further comprising: creating an index based on the at least one metadata; storing each of the index and the plurality of content streams in a storage device; receiving a search query comprising a metadata from an electronic device; executing the search query on the index; retrieving at least one content stream based on the executing; and transmitting the at least one content steam to the electronic device.

Aspect 18. The method of Aspect 1 further comprising transmitting the aggregated content stream to at least one mobile device of the plurality of mobile devices.

Aspect 19. The method of Aspect 1 further comprising: determining a network characteristic associated with a network connection of a mobile device of the plurality of mobile devices; identifying a content stream from the aggregated content stream based on the network characteristic, wherein the plurality of content streams is associated with a plurality of network characteristics; and playing the content stream on the mobile device.

Aspect 20. The method of Aspect 19, wherein the network characteristic comprises at least one of network bandwidth, error rate, signal distortion, type of communication channel and network communication standard.

Aspect 21. The method of Aspect 1 further comprising: determining a device characteristic of a mobile device of the plurality of mobile devices; identifying a content stream from the aggregated content stream based on the device characteristic, wherein the plurality of content streams is associated with a plurality of device characteristics; and transmitting the content stream to the mobile device.

Aspect 22. The method of Aspect 21, wherein the device characteristic comprises at least one of screen resolution, refresh rate, decoding capability, processor speed and memory capacity.

Aspect 23. The method of Aspect 1 further comprising: transmitting a plurality of indicators corresponding to the plurality of content streams in the aggregated content stream to at least one mobile device; receiving a selection of at least one indicator of the plurality of indicators from the at least one mobile device; and transmitting at least one content stream corresponding to the at least one indicator to the at least one mobile device.

Aspect 24. The method of Aspect 1 further comprising encoding the aggregated content stream based on a media file format.

Aspect 25. The method of Aspect 24, wherein the media file format comprises ISO/IEC 14496-12 Base Media File Format (BMFF).

Aspect 26. A system for aggregating content streams, the system comprising:
a communication unit configured to receive a plurality of content streams from a plurality of mobile devices, wherein each of the plurality of mobile devices comprises at least one recorder configured to generate a content stream, wherein each of the plurality of content streams is associated with at least one metadata; and
a processing unit configured to:
analyze the at least one metadata; and
aggregate the plurality of content streams into an aggregated content stream based on a result of the analyzing.

Aspect 27. The system of Aspect 26, wherein the content stream comprises at least one of an audio stream and a video stream.

Aspect 28. The system of Aspect 26, wherein the at least one metadata comprises at least one of a time data, a location data, a context data, a device indicator and a device state indicator.

Aspect 29. The system of Aspect 28, wherein the device indicator is associated with at least one characteristic of the at least one recorder.

Aspect 30. The system of Aspect 29, wherein the at least one characteristic comprises a spatial resolution, a temporal resolution, white balance, gain, shutter speed, aperture size, a focal length and an encoding scheme.

Aspect 31. The system of Aspect 28, wherein the device state indicator associated with a content stream indicates at least one state of a mobile device generating the content stream.

Aspect 32. The system of Aspect 31, wherein the at least one state corresponds to at least one sensor comprised in the mobile device.

Aspect 33. The system of Aspect 32, wherein the at least one sensor comprises at least one of a location sensor, an orientation sensor, an accelerometer, an altitude sensor and a speed sensor.

Aspect 34. The system of Aspect 33, wherein the plurality of mobile devices comprises at least one drone configured for flight.

Aspect 35. The system of Aspect 26, wherein the at least one metadata comprises a time data, wherein each of the plurality of mobile devices comprise a timer configured to generate the time data, wherein each timer is synchronized to a common time base.

Aspect 36. The system of Aspect 26, wherein the analysis comprises comparison of a first metadata associated with a first content stream with a second metadata associated with a second content stream, wherein the aggregation comprises determination of each of the first content stream and the second content stream as being associated with an event based on a result of the comparison.

Aspect 37. The system of Aspect 36, wherein the result of the comparison comprises a difference between the first metadata and the second metadata, wherein the determining is based on the difference being less than a predetermined threshold.

Aspect 38. The system of Aspect 36, wherein the result of the comparison comprises a difference between the first metadata and the second metadata, wherein the determining is based on the difference being greater than a predetermined threshold.

Aspect 39. The system of Aspect 36, wherein the first content stream is associated with a first Point Of View (POV) and the second content stream is associated with a second POV, wherein the first metadata indicates the first POV, wherein the second metadata indicates the second POV, wherein the aggregated content stream comprises the plurality of content streams corresponding to a plurality of POVs, wherein the plurality of content streams corresponds to an event.

Aspect 40. The system of Aspect 38, wherein the first content stream is associated with a first location and the second content stream is associated with a second location, wherein the first metadata indicates the first location, wherein the second metadata indicates the second location, wherein the aggregated content stream comprises the plurality of content streams corresponding to a plurality of locations, wherein the plurality of content streams corresponds to an event.

Aspect 41. The system of Aspect 36, wherein the result of the comparison comprises a difference between the first metadata and the second metadata, wherein the determining is based on the difference being within a predetermined range.

Aspect 42. The system of Aspect 26, wherein the communication unit is further configured to:
receive a search query comprising a metadata from an electronic device; and
transmit at least one content steam to the electronic device, wherein the processing unit is further configured to:
create an index based on the at least one metadata;
store each of the index and the plurality of content streams in a storage device;
execute the search query on the index; and
retrieve at least one content stream based on the executing.

Aspect 43. The system of Aspect 26, wherein the communication unit is further configured to transmit the aggregated content stream to at least one mobile device of the plurality of mobile devices.

Aspect 44. The system of Aspect 26, wherein the processing unit is further configured to: determine a network characteristic associated with a network connection of a mobile device of the plurality of mobile devices;
identify a content stream from the aggregated content stream based on the network characteristic, wherein the plurality of content streams is associated with a plurality of network characteristics; and
play the content stream on the mobile device.

Aspect 45. The system of Aspect 44, wherein the network characteristic comprises at least one of network bandwidth, error rate, signal distortion, type of communication channel and network communication standard.

Aspect 46. The system of Aspect 26, wherein the processing unit is further configured to:
determine a device characteristic of a mobile device of the plurality of mobile devices;
identify a content stream from the aggregated content stream based on the device characteristic, wherein the plurality of content streams is associated with a plurality of device characteristics; and
transmit the content stream to the mobile device.

Aspect 47. The system of Aspect 46, wherein the device characteristic comprises at least one of screen resolution, refresh rate, decoding capability, processor speed and memory capacity.

Aspect 48. The system of Aspect 26 wherein the communication unit is further configured to:
transmit a plurality of indicators corresponding to the plurality of content streams in the aggregated content stream to at least one mobile device;
receive a selection of at least one indicator of the plurality of indicators from the at least one mobile device; and
transmit at least one content stream corresponding to the at least one indicator to the at least one mobile device.

Aspect 49. The system of Aspect 26, wherein the processing unit is further configured to encode the aggregated content stream based on a media file format.

Aspect 50. The system of Aspect 49, wherein the media file format comprises ISO/IEC 14496-12 Base Media File Format (BMFF).

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method for organizing a plurality of content streams, the method comprising:
receiving the plurality of content streams and a metadata associated with each of the plurality of content streams;
analyzing the metadata associated with each of the plurality of content streams for at least one of the following:
geo-location data in order to determine which of the plurality of content streams comprise content captured in spatial proximity, and
timing data in order to determine which of the plurality of content streams comprise content captured in temporal proximity
grouping at least two content streams of the plurality of content streams based on the analyzed metadata associated with each content stream when at least one of the following occur:
the at least two content streams are determined to be captured in the spatial proximity,
the at least two content streams are determined to be captured in the temporal proximity;
analyzing the metadata associated with each of the at least two content streams for orientation data in order to determine a point of view associated with each of the at least two content streams, wherein a statistical analysis of the metadata is employed to derive statistical data for each of the at least two content streams;
establishing a multiple stream container for aggregating the at least two content streams, and
arranging the presentation of the grouped content streams based on the analyzed metadata for layout within the multiple stream container, wherein:
the presentation comprises displaying a visual representation of the at least two content streams within the multiple stream container, and includes the statistical data associated with the aggregated content streams in the multiple screen container; and
the visual representation for each content stream is based on the metadata associated with each content stream, the metadata comprising the orientation data.

2. The method of claim 1, wherein establishing the multiple stream container comprises: receiving information associated with a criteria for content streams to be placed into the multiple stream container.

3. The method of claim 2, further comprising:
comparing the criteria to data points within the metadata associated with each content stream, and
adding, into the multiple stream container, each content stream that meets the criteria into the content stream.

4. The method of claim 2, wherein analyzing the metadata associated with each of the plurality of content streams for the timing data comprises matching the timing data with the criteria established for the multiple stream container.

5. The method of claim 2, wherein analyzing the metadata associated with each of the plurality of content streams for the geo-location data comprises matching the geo-location data with the criteria established for the multiple stream container.

6. The method of claim 1, wherein analyzing the metadata associated with each of the plurality of content streams further comprises at least one of the following:
employing the statistical analysis based on analyzing the metadata to determine a frequency of content captured in at least one of the following, the spatial proximity, and the temporal proximity; and deriving statistical data based on the statistical analysis.

7. The method of claim 6, further comprising: presenting the multiple stream container; and
presenting the statistical data associated with the aggregated content streams in the multiple stream container.

8. The method of claim 6, further comprising: presenting the multiple stream container; and
presenting data associated with the event in the proximal space and time.

9. The method of claim 1, wherein establishing the multiple stream container comprises:
labeling each aggregated content streams within the multiple stream container, wherein labeling the content within the multiple stream container comprises employing at least one identifier associated with computing devices used to capture the content.

10. The method of claim 9, wherein employing the at least one identifier in labeling the multiple stream container comprises employing at least one of the following:
participant name, account ID, device ID,
a location of capture associated with each content stream,
a time of capture associated with each content stream,
orientation data associated with each content stream, and
statistical data associated with each content stream.

11. The method of claim 10, wherein labeling the content streams is configured to enable indexing, searching, and discovery of each content stream based on, at least in part, the identifiers.

12. The method of claim 1, wherein establishing the multiple stream container comprises establishing the multiple stream container prior to receiving content into the multiple stream container.

13. The method of claim 1, wherein establishing the multiple stream container comprises establishing the multiple stream container after receiving content for the multiple stream container.

14. The method of claim 1, wherein analyzing the metadata associated with each of the plurality of content streams for the timing data comprises determining which of the plurality of content streams were captured at a moment of interest.

15. The method of claim 1, wherein analyzing the metadata associated with each of the plurality of content streams for the geo-location data comprises determining which of the plurality of content streams were captured at a location of interest.

16. The method of claim 1, further comprising: determining that the content streams comprising content captured in the spatial proximity and the temporal proximity correspond to an event in proximal space and time.

* * * * *